United States Patent
Chen et al.

(10) Patent No.: US 12,439,859 B2
(45) Date of Patent: Oct. 14, 2025

(54) STACKABLE RAISING SEEDLING DEVICE AND METHOD USING THE SAME

(71) Applicant: YESHEALTH AGRI-BIOTECHNOLOGY CO., LTD., Taoyuan (TW)

(72) Inventors: Wen-Yang Chen, Taoyuan (TW); Huan-Wun Chen, Taoyuan (TW); Wen-Chin Tsai, Taoyuan (TW)

(*) Notice: Subject to any disclaimer, the term of this patent is extended or adjusted under 35 U.S.C. 154(b) by 895 days.

(21) Appl. No.: 17/573,949

(22) Filed: Jan. 12, 2022

(65) Prior Publication Data

US 2022/0132750 A1    May 5, 2022

Related U.S. Application Data

(63) Continuation-in-part of application No. 16/809,952, filed on Mar. 5, 2020, now abandoned.

(51) Int. Cl.
| | |
|---|---|
| *A01G 9/029* | (2018.01) |
| *A01G 24/44* | (2018.01) |
| *A01G 24/48* | (2018.01) |
| *A01G 31/02* | (2006.01) |
| *A01G 31/04* | (2006.01) |
| *A01G 31/06* | (2006.01) |

(52) U.S. Cl.
CPC ........... *A01G 9/0297* (2018.02); *A01G 24/44* (2018.02); *A01G 24/48* (2018.02); *A01G 31/04* (2013.01); *A01G 31/06* (2013.01)

(58) Field of Classification Search
CPC ...... A01G 9/0297; A01G 31/00; A01G 31/06; A01G 9/022; A01G 9/0295
See application file for complete search history.

(56) References Cited

U.S. PATENT DOCUMENTS

| | | | | |
|---|---|---|---|---|
| 4,296,569 | A * | 10/1981 | Edwards | A01G 9/0297 47/73 |
| 4,769,946 | A * | 9/1988 | de Groot | A01G 9/0295 47/73 |
| 5,315,786 | A * | 5/1994 | Smith | A01G 9/0295 47/74 |
| 11,582,927 | B1 * | 2/2023 | Mizrakci | A01G 9/0293 |
| 12,102,047 | B2 * | 10/2024 | Venderbosch | A01G 7/02 |

(Continued)

FOREIGN PATENT DOCUMENTS

| | | |
|---|---|---|
| CN | 101731135 A | 6/2010 |
| JP | WO2015/181944 A1 | 12/2015 |

*Primary Examiner* — Kristen C Hayes

(57) ABSTRACT

A stackable raising seedling device has a device body and a floating planting board. The device body has raising seedling hole parts disposed at intervals and holes disposed intervals. The raising seedling hole pans and the holes are staggered in parallel and with each other along a first direction, the raising seedling hole part and the holes are staggered in parallel with each other along a second direction, and the holes of the first direction and the raising seedling hole parts of the second direction are adjacently arranged. The raising seedling hole pan can receive a culture medium layer, the culture medium layer has an agar gel, and the agar gel is composed of a plant growth nutrient, agar powder and water. The present disclosure improves the overall seed germination rate and the quality of planted crops when massively planting the planted crops.

6 Claims, 34 Drawing Sheets

(56) References Cited

U.S. PATENT DOCUMENTS

| | | | |
|---|---|---|---|
| 2008/0115413 A1* | 5/2008 | Blackmore | B65D 85/52 47/65.5 |
| 2016/0353673 A1* | 12/2016 | Miller | A01G 9/0297 |
| 2019/0230876 A1* | 8/2019 | Lysaa | A01G 31/06 |
| 2023/0413747 A1* | 12/2023 | Rollwa | A01G 31/06 |

* cited by examiner

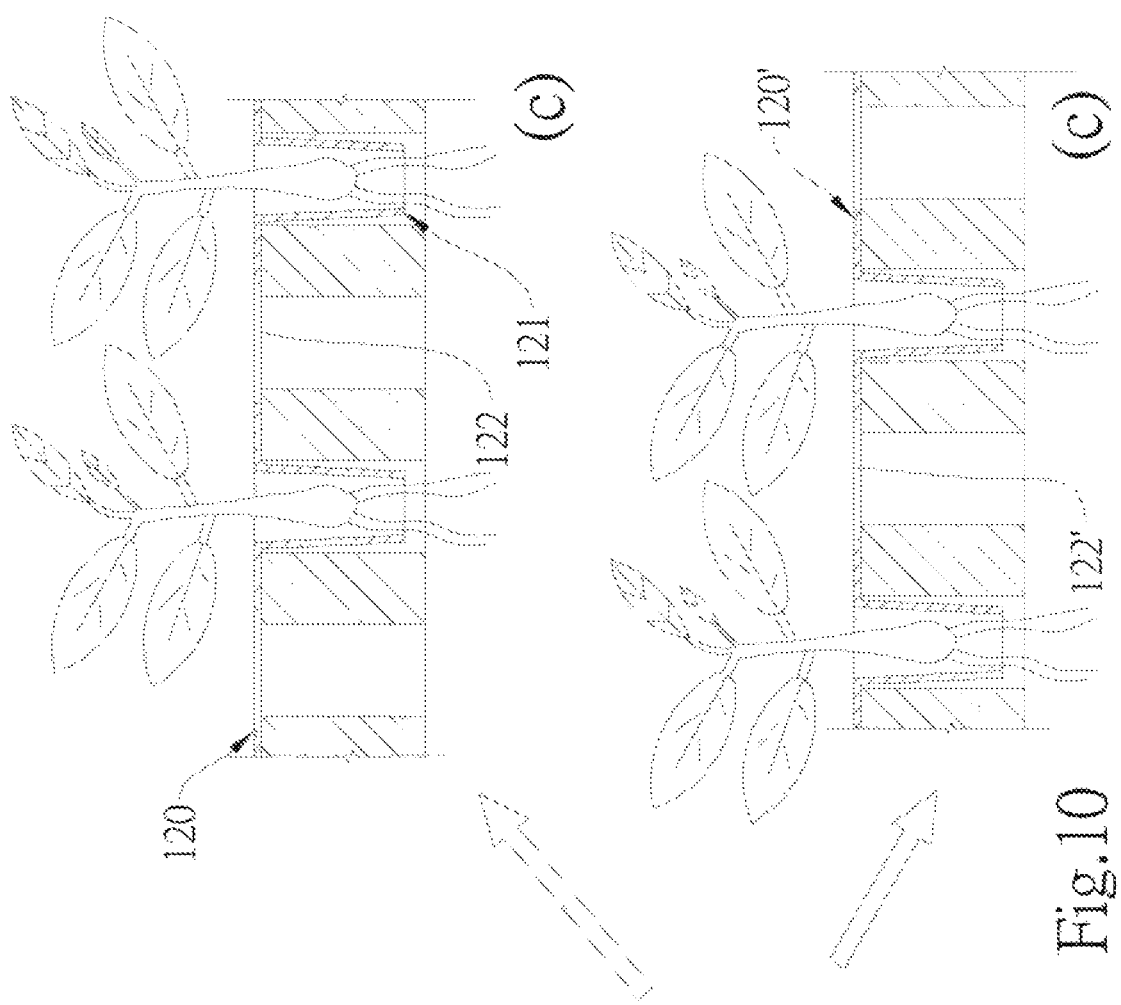
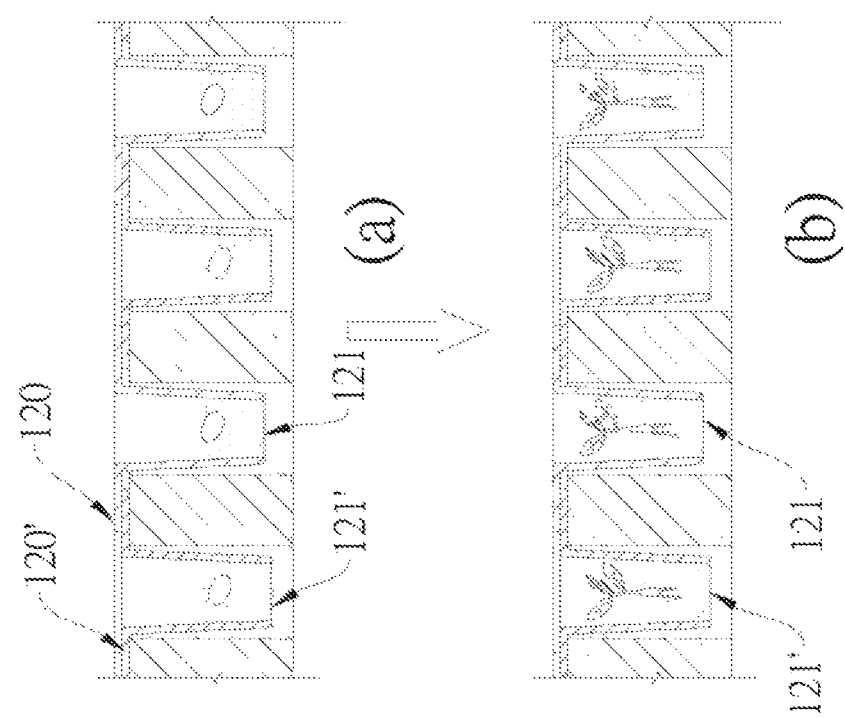
Fig. 10

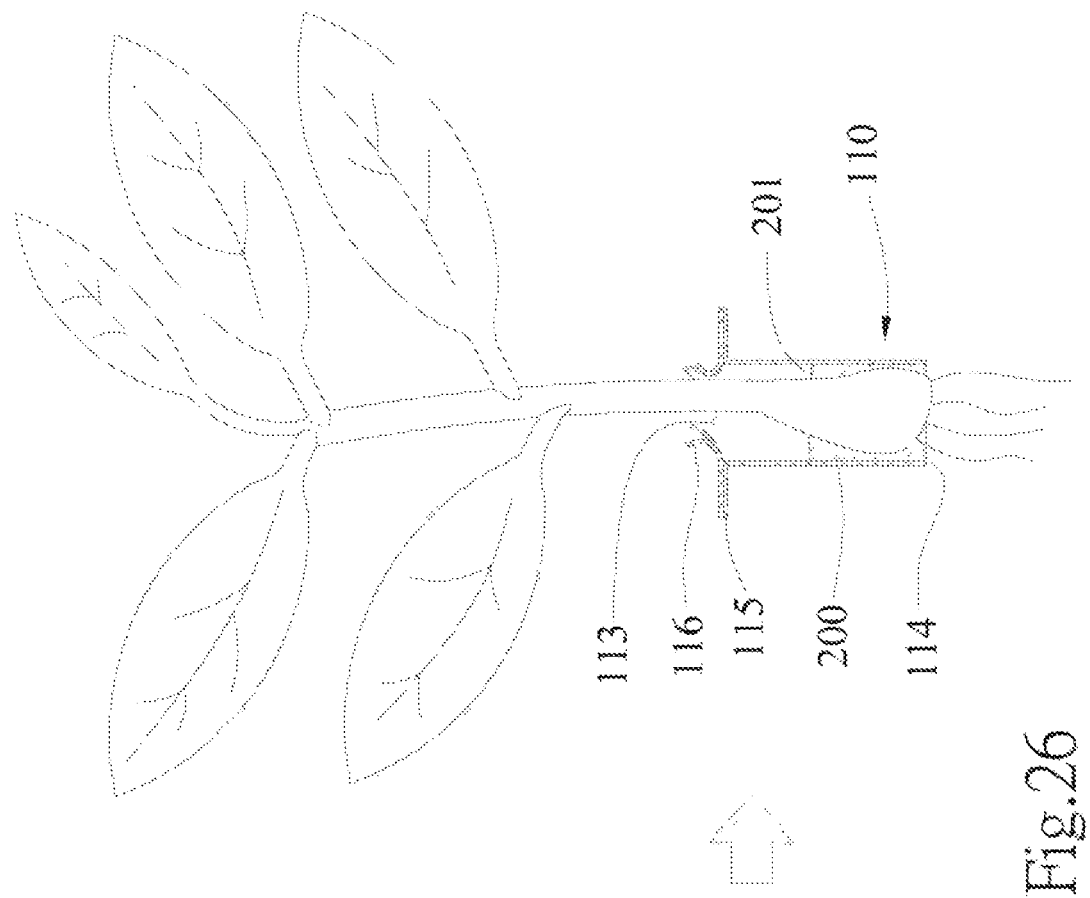
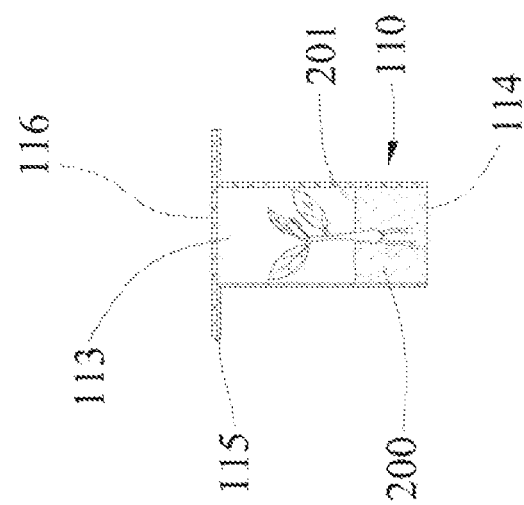
Fig. 26

STACKABLE RAISING SEEDLING DEVICE AND METHOD USING THE SAME

CROSS REFERENCE

The present invention is Continuation-in-part Application of U.S. patent application Ser. No. 16/809,952 filed on Mar. 5, 2020, wherein all contents of the references which priorities are claimed by the present invention are included in the present invention, herein.

TECHNICAL FIELD

The present disclosure relates to a stackable raising seedling device and a method using the same, in particular to a stackable raising seedling device and a method using the stackable raising seedling device, which contains a culture medium layer and can adjust its stacking manner according to the growth situation of the planted crops to make the seedlings of the planted crops have sufficient growth space.

RELATED ART

With the excessive industrial development of human beings, a global greenhouse effect has become more and more intense and accompanied by drastic climate changes. The traditional way of planting crops in soil is susceptible to changes in the natural environment and the instability of the climate, which affects a harvest of crops. Further, unpredictable natural disasters, insect pests and man-made environmental pollution make traditional soil cultivation gradually difficult to meet the quality requirements of humans for planting the crops.

Thus, to cure cons of conventional soil cultivation, hydroponics is thus proposed, as shown in FIG. 1. Generally, the hydroponics is to dispose a sponge (A) in a reception slot (C) comprising a nutrient (B), and then, to plant a crop seed (D) on the sponge (A). Since the hydroponics does not require soil, it is not limited by agricultural land requirements of the conventional agriculture, and compared to the conventional soil cultivation, it can further avoid from the effects of unpredictable natural disasters, insect pests and man-made environmental pollution. In recent years, with the rise of environmental awareness, the use of disposable plastic waste has gradually been reduced. However, by using the above hydroponics, when the crops grow, the sponges are destroyed by roots of the grown crops, and thus a large amount of the sponges are unreusable after harvesting the crops. Further, when planting the crops on the sponges as bases, the roots of planted crops are often oppressed by sponge, which limits the growth of rhizomes and affects the growth and health of planted crops. In addition, nutrient used in the hydroponics will continuously accumulate chemical components or salts in water. Excessive concentrations of chemicals and salts will harm growth of the crops.

How to effectively improve the growth of roots of planted crops caused by the use of the sponges of the above hydroponics by using an innovative hardware design, how to avoid generation of a large number of unreusable sponges after the harvest of planted crops and how to avoid the accumulation of chemicals and salts which harm the growth of the planted crops are issues that the industry developers and related researchers need to continue their efforts to overcome and solve.

SUMMARY

An objective of the present disclosure is to provide is to provide a stackable raising seedling device and a method using the same. Through the culture medium layer containing plant growth nutrient, the nutrient solution used in hydroponic cultivation can be prevented from continuously accumulating and affecting the growth and health of planted crops. By using tire stackable raising seedling device, the stacking fashion of the stackable raising seedling devices be further adjusted according to the growth of planted crops.

In a preferred embodiment, an objective of the present disclosure is to provide a stackable raising seedling device which comprises a device body and a floating planting board. The device body has a raising seeding hole parts disposed at intervals and holes disposed intervals, wherein the raising seeding hole parts and the holes are staggered in parallel and with each other along a first direction, the raising seeding hole pan and the holes are staggered in parallel with each other along a second direction, and the holes of the first direction and the raising seeding hole pans of the second direction are adjacently arranged. The device body has a top surface and a bottom surface, each of the raising seeding hole parts comprises a hollow body, the hollow body is formed with a top hole and a bottom hole, the bottom hole is opposite to the top hole and extending from one end of the top hole, the top hole faces the top surface, the bottom hole is located on the bottom surface, and the hole and the raising seeding hole part penetrate the top surface and the bottom surface. The hollow body is a cone structure that tapers from the top hole to the bottom hole, and in the cone structure, an aperture of the top hole is the largest, and an aperture of the bottom hole is the smallest. A raising seeding hole pan of another one device body is capable of placing in the hole of the device body, and the device body is provided to be stacked under or on the other one device body and to be shifted with the other one device body along the first direction or the second direction. The device body is integrally formed. The floating planting board has perforations disposed at intervals, each of the raising seeding hole parts is placed in the corresponding perforation, the perforation has a top perforation and a bottom perforation, and the bottom perforation is opposite to the top perforation and extended from one end of the top perforation. A distance between the top perforation and the bottom perforation is defined as a first depth, a distance between the top hole and the bottom hole is defined as a second depth, and the first depth is larger than the second depth. The raising seeding hole part is used to receive a culture medium layer, the culture medium layer comprises an agar gel, and the agar gel is composed of a plant growth nutrient, agar powder and water.

In the preferred embodiment, the aperture of the top hole of the raising seeding hole part is less than an aperture of the hole.

In the preferred embodiment, the device body is a sheet device body.

In the preferred embodiment, a method of preparing the agar gel comprising: mixing and dissolving the plant growth nutrient in the water to form a plant growth nutrient solution; adjusting a pH of the plant growth nutrient solution to be 6.0; adding the agar powder in the plant growth nutrient solution and heating the plant growth nutrient solution until the agar powder has been dissolved, so as to form an agar solution; preparing the raising seeding hole part and disposing the raising seeding hole part on a freezing plate with a freezing temperature; and adding the agar solution of a predetermined volume in the raising seeding hole part and freezing the agar solution to a cooling temperature, so as to form the agar gel.

In the preferred embodiment, an outer curved surface of the hollow body and a horizontal plane therebetween have a tilted angle therebetween, and the tilted angle is less than 90 degrees.

In the preferred embodiment, the stackable raising seedling device further comprises a water-retaining film disposed to cover the top hole.

In the preferred embodiment, the stackable raising seedling device further comprises a light shielding part disposed to cover the lop hole.

In the preferred embodiment, the stackable raising seedling device is installed on a crop cistern.

In the preferred embodiment, an objective of the present disclosure is to provide a method of using a stackable raising seedling device, and the method comprises the following steps: slacking one of tire stackable raising seedling devices on or under another one of the stackable raising seedling devices and staggeredly placing one of the stackable raising seedling devices parallel to another one of the stackable raising seedling devices; disposing a vegetable seed on or in the culture medium layer; disposing the stackable raising seedling devices on the floating planting hoard; slacking one of the floating planting boards on or under another one of the floating planting boards; and disposing the stacked floating planting boards in a darkroom.

In the preferred embodiment, an objective of the present disclosure is to provide a method of using a stackable raising seedling device, and the method comprises the following steps: stacking one of the stackable raising seedling devices on or under another one of the stackable raising seedling devices and shifting one of the stackable raising seedling devices with another one of the stackable raising seedling devices along the first direction or the second direction; disposing a vegetable seed on or in the culture medium layer; disposing the stackable raising seedling devices on the floating planting board; and disposing the floating planting board on a crop cistern.

An objective of another one preferred embodiment of the present disclosure is to provide a stackable raising seedling device which comprises a device body and a floating planting board. Raising seeding hole parts are disposed on the device body, first holes are disposed on the device body, and first holes are respectively corresponding to raising seeding hole pans of another one stackable raising seedling device, wherein the raising seeding hole pans and the first holes are staggered with each other along a first direction to form a row of at least one first hole group. The device body has a top surface and a bottom surface, each of the raising seeding hole parts comprises a hollow body, the hollow body is formed with a top hole and a bottom hole, the bottom hole is opposite to the top hole and extending front one end of the top hole, the top hole faces the top surface, the bottom hole is located on the bottom surface, and the hole and the raising seeding hole part penetrate the top surface and the bottom surface. The hollow body is a cone structure that tapers from the top hole to the bottom hole, and in the cone structure, an aperture of the top hole is the largest, and an aperture of the bottom hole is the smallest. A raising seeding hole part of another one device body is capable of placing in the hole of the device body, and the device body is provided to be stacked under or on the other one device body and to be shifted with the other one device body along the first direction or the second direction. The device body is integrally formed. The floating planting board has perforations disposed at intervals, each of the raising seeding hole pans is placed in the corresponding perforation, the perforation has a top perforation and a bottom perforation, and the bottom perforation is opposite to the top perforation and extended from one end of the top perforation. A distance between the lop perforation and the bottom perforation is defined as a first depth, a distance between the top hole and the bottom hole is defined as a second depth, and the first depth is larger than the second depth. The raising seeding hole part is used to receive a culture medium layer, the culture medium layer comprises an agar gel, and the agar gel is composed of a plant growth nutrient, agar powder and water.

In the other one preferred embodiment, the stackable raising seedling device further comprises a row of at least one second hole group, the at least one second hole group and the at least one first hole group are arranged adjacently, the at least one second hole group comprises the first holes and at least one second hole, the first holes and the at least one second hole are arranged adjacent to each other along the first direction, and the second hole is corresponding the raising seeding hole parts of the other one stackable raising seedling device.

In the other one preferred embodiment, after the stackable raising seedling devices are stacked, centers of any two adjacent raising seeding hole parts have a minimum distance d therebetween, and a distance from the center of the raising seeding hole part to the center of a first semicircle edge of the first hole is the minimum distance d.

In the other one preferred embodiment, the first hole is defined by two opposite first semicircle edges and two opposite first linear edges connected to the first semicircle edges, and the raising seeding hole part is defined by a cycle edge, wherein a radius of the cycle edge of the first hole is $R2$.

In the other one preferred embodiment, a length of the first hole is defined by an equation, $L11=2R1+(N1-1)d$, wherein $L11$ is the length of the first hole. $N1$ is a number of the raising seeding hole parts corresponding to the first hole, and d is the minimum distance between the centers of the two adjacent raising seeding hole parts, wherein a radius of the first semicircle edge of the first hole is $R1$.

In the other one preferred embodiment, the at least one second hole is defined by a connection of the two opposite second semicircle edges and the two opposite second linear edges.

In the other one preferred embodiment, a length of the second hole is defined by an equation. $L22=2R3+N2-1)d$, wherein $L22$ is the length of the second hole, $N2$ is a number of the raising seeding hole parts corresponding to the second hole, and $N2>N1$ wherein a radius of the second semicircle edge of the second hole is $R3$.

In the oilier one preferred embodiment, an aperture of the top hole of the raising seeding hole part is less than an aperture of the hole.

In the other one preferred embodiment, the device body is a sheet device body.

In the other one preferred embodiment, a method of preparing the agar gel comprising: mixing and dissolving the plant growth nutrient in the water to form a plant growth nutrient solution; adjusting a pH of the plant growth nutrient solution to be 6.0; adding the agar powder in the plant growth nutrient solution and heating the plant growth nutrient solution until the agar powder has been dissolved, so as to form an agar solution; preparing the raising seeding hole part and disposing the raising seeding hole part on a freezing plate with a freezing temperature; and adding the agar solution of a predetermined volume in the raising seeding hole part and freezing the agar solution to a cooling temperature, so as to form the agar gel.

In the other one preferred embodiment, an outer curved surface of the hollow body and a horizontal plane therebetween have a tilted angle therebetween, and the tilted angle is less than W degrees.

In the other one preferred embodiment, the stackable raising seedling device further comprises a water-retaining film disposed to cover the top hole.

In the other one preferred embodiment, the stackable raising seedling device further comprises a light shielding part disposed to cover the top hole.

In the other one preferred embodiment, the stackable raising seedling device is installed on a crop cistern.

In the other one preferred embodiment, an objective of the present disclosure is to provide a method of using a stackable raising seedling device, and the method comprises the following steps: slacking one of the stackable raising seedling devices on or under another one of the stackable raising seedling devices and shifting one of the stackable raising seedling devices with another one of the stackable raising seedling devices along the first direction or the second direction; disposing a vegetable seed on or in the culture medium layer; disposing the stackable raising seedling devices on the floating planting board; stacking one of the floating planting boards on or under another one of the floating planting boards, and disposing the stacked floating planting boards in a darkroom.

In the other one preferred embodiment, an objective of the present disclosure is to provide a method of using a stackable raising seedling device, and the method comprises the following steps: stacking one of the stackable raising seedling devices on or under another one of the stackable raising seedling devices and shilling one of the stackable raising seedling devices with another one of the stackable raising seedling devices along the first direction or the second direction; disposing a vegetable seed on or in the culture medium layer; disposing the stackable raising seedling devices on the floating planting board; and disposing the floating planting board on a crop cistern.

Accordingly, in the present disclosure, the stackable raising seedling device and the culture medium layer containing the plant growth nutrient can used for applying different stack structures corresponding to different growth stage of the planted crops. For example, in different periods such as the sowing period, the seedling period or the seedling raising period, the stacking manner can be adjusted to achieve the most efficient use of the area structure and the configuration in a planting tray with a limited seedling area.

DRAWINGS

FIG. 10 is another one schematic diagram showing an usage of planting plant seedlings according to the preferred embodiment of the present disclosure.

FIG. 26 is a schematic diagram showing another one step of a culture medium structure usage method according to an embodiment of the present disclosure.

DETAILED DESCRIPTION OF THE PREFERRED EMBODIMENTS

Figure 1:
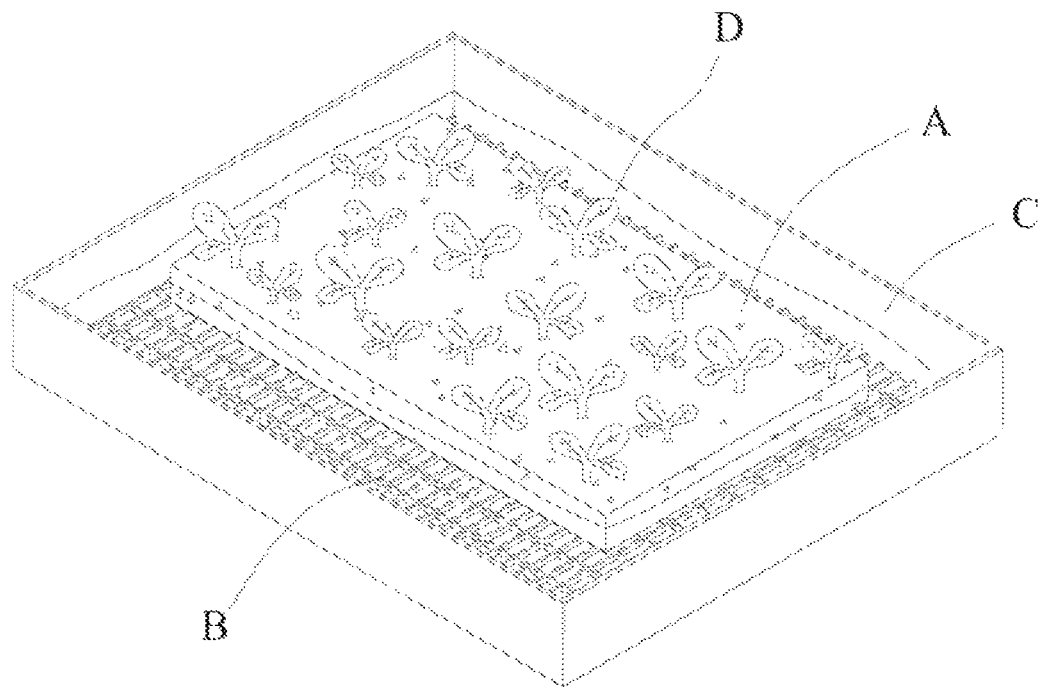
FIG. 1 is schematic diagram showing a conventional hydroponics.
Figure 2:
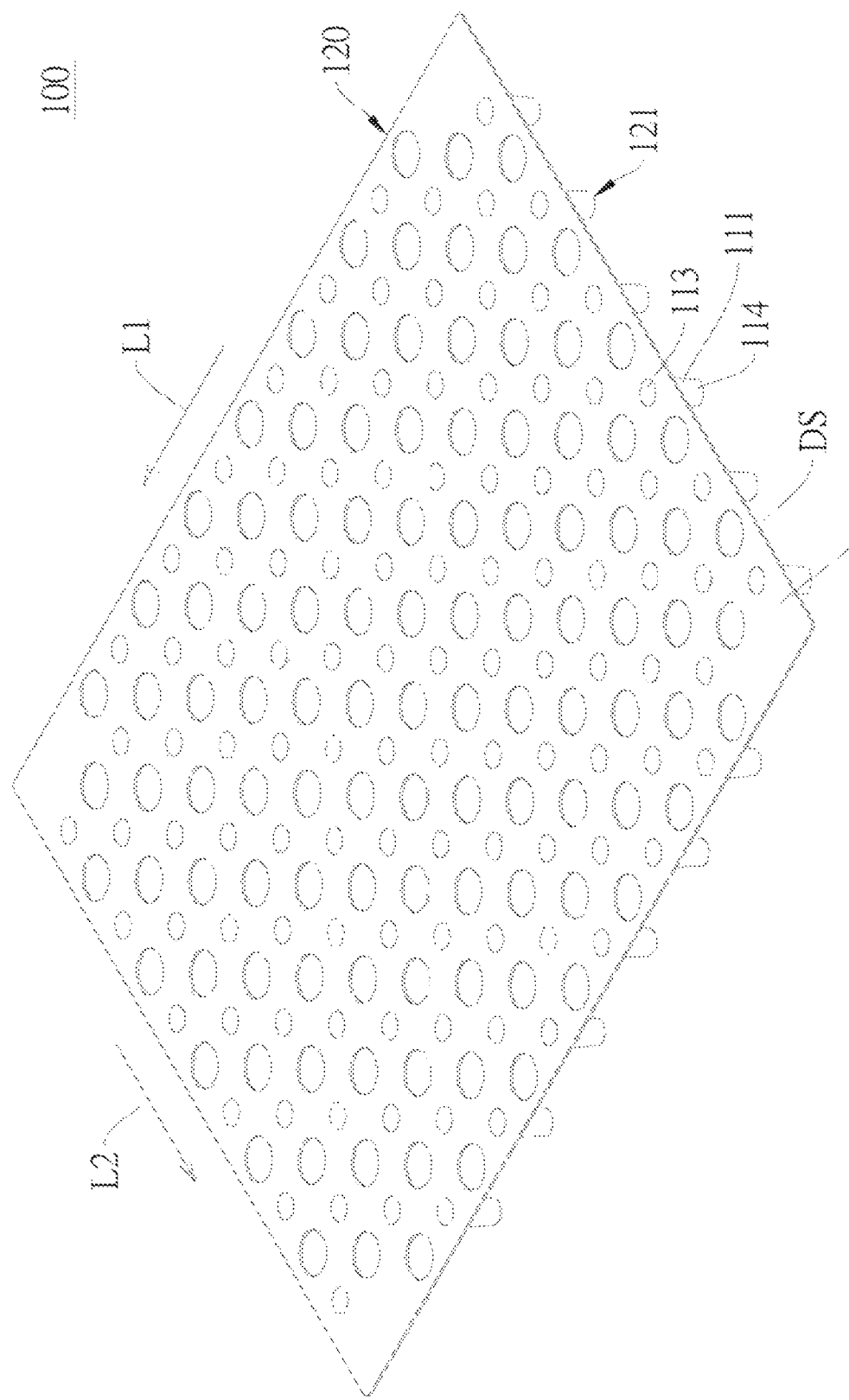
FIG. 2 is a whole structure diagram of a device body according to a preferred embodiment of the present disclosure.

In order to facilitate the examiner to understand the technical features, the contents and the advantages of the present disclosure, as well as the efficacy that can be reached by the present disclosure, the present disclosure will now be described in detail with the drawings and the form of expression of the embodiments. The drawings used are only for illustration and support of the specification, and hence are not necessarily accurate in scale and precise in configuration after implementation of the present disclosure. Therefore, it should not be interpreted based upon the scale and the configuration on the drawings to confine the scope of the rights claimed on the practical implementation of the present disclosure.

In order to make the description of the present disclosure more detailed and complete, the following paragraphs give descriptions of the implementations and specific embodiments of the present disclosure, but they are not the only forms of implementing or using the specific embodiments of the present disclosure.

Please refer to FIG. 2 through FIG. 5, a main objective of the present disclosure is to provide a stackable raising seedling device 100, which comprises a device body 120, and the device body 120 comprises raising seedling hole parts 121 disposed at intervals and holes 122 disposed at intervals, wherein the raising seedling hole parts 121 and the holes 122 are staggered in parallel and with each other along a first direction L1, the raising seedling hole part 121 and the holes 122 are staggered in parallel with each other along a second direction L2, and the holes 122 of the first direction L1 and the raising seedling hole parts 121 of the second direction L2 are adjacently arranged. The raising seedling hole parts 121 and the holes 122 can be exemplified but not limited to circle, square or any geometric shapes, and the preferred structure shape design is a circle. The present disclosure is not limited to the structure shapes of the raising seedling hole parts 121 and the holes 122. It can be adapted and adjusted according to the needs of use. It is notes that the term "stackable" in "stackable raising seedling, device" means the stackable raising seedling device 71 is provided to be stacked on or under another one the stackable raising seedling device, and to be shifted with the other one stackable raising seedling device along the first direction L1 or the second direction L2.

The device body 120 has a top surface US and a bottom surface DS, each of the raising seeding hole parts 121 comprises a hollow body 111, the hollow body 111 is formed with a top hole 113 and a bottom hole 114, the bottom hole 114 is opposite to the top hole 113 and extending from one end of the top hole 113, the top hole 113 faces the top surface US, the bottom hole 114 is located on the bottom surface DS, and the hole 122 and the raising seeding hole part 121 penetrate the top surface US and the bottom surface DS. The device body 120 is a sheet device body. When implementing, the top hole 113 allows the planted crops to grow upward, and the bottom hole 114 allows the roots of the planted crops to pass through the bottom hole 114 and grow downwards, so as to solve the problem of affecting the health of growth caused by that the roots are compressed by the sponge during growth when using of sponge as a base to grow planted crops in the past.

The hollow body 111 is a cone structure that tapers from the top hole 113 to the bottom hole 114, and in the con structure, an aperture of the top hole 113 is the largest, and an aperture of the bottom hole 114 is the smallest. An outer curved surface 112 of the hollow body 111 and a horizontal plane P therebetween have a tilted angle $\theta$ therebetween, and the tilted angle $\theta$ is less than 90 degrees. The aperture d1 of the top hole 113 of the raising seeding hole part 121 is less than an aperture d2 of the hole 122. When implementing, the tilted angle $\theta$ is designed to be less than 90 degrees, and the raising seeding hole part 121 is designed to be cone structure that tapers from the top hole 113 to the bottom hole 114. Thus, the raising seeding hole part 121 can be a container having capability of preventing the culture medium layer 20 from falling.

A raising seeding hole part 121' of another one device body 120' is capable of placing in the hole 122 of the device body 120, and the device body 120 is stacked on or under the other one device body 120' and shifted with the other one device body 120' along the first direction L1 or lire second direction L2. Thus, it can achieve centralized management and transportation in an environment with limited resources for planting the planted crops, and it can change the spacing between planted crops to match the growth spacing required by different growth stage of the planted crops.

In the present disclosure, the device body 120 is stacked on or under the other one device body 120' and shifted with the other one device body 120' along the first direction L1 or the second direction L2, and the device bodies 120 and 120' have the same structures. In order to make the device bodies 120 and 120' be light and thin as a whole and easy to operate and use, both the device body 120 and the device body 120' are designed in the structure of a sheet device body, so they have the advantages of low manufacturing cost and mass production. Specifically, the raising seeding hole part 121 of the device body 120 is shifted with the raising seeding hole part 121' having the structure same as that of the raising seeding hole part 121 of the device body 120' along the first direction L1 or the second direction L2, and the hole 122 of the device body 120 is shifted with the hole 122' of the device body 120' along the first direction L1 or the second direction L2. Thus, the raising seeding hole parts 121, 121' of the same device bodies 120, 120' will not be overlapped each other, and the holes 122, 122' will not be overlapped each other. It is noted that, an aperture of the raising seeding hole part 121 of the device body 120 is less than an aperture of the hole 122. In the similar way, an aperture of the raising seeding hole part 121' of the device body 120' is less than that of the hole 122'. Further, the device body 120 is integrally formed.

Figure 4:
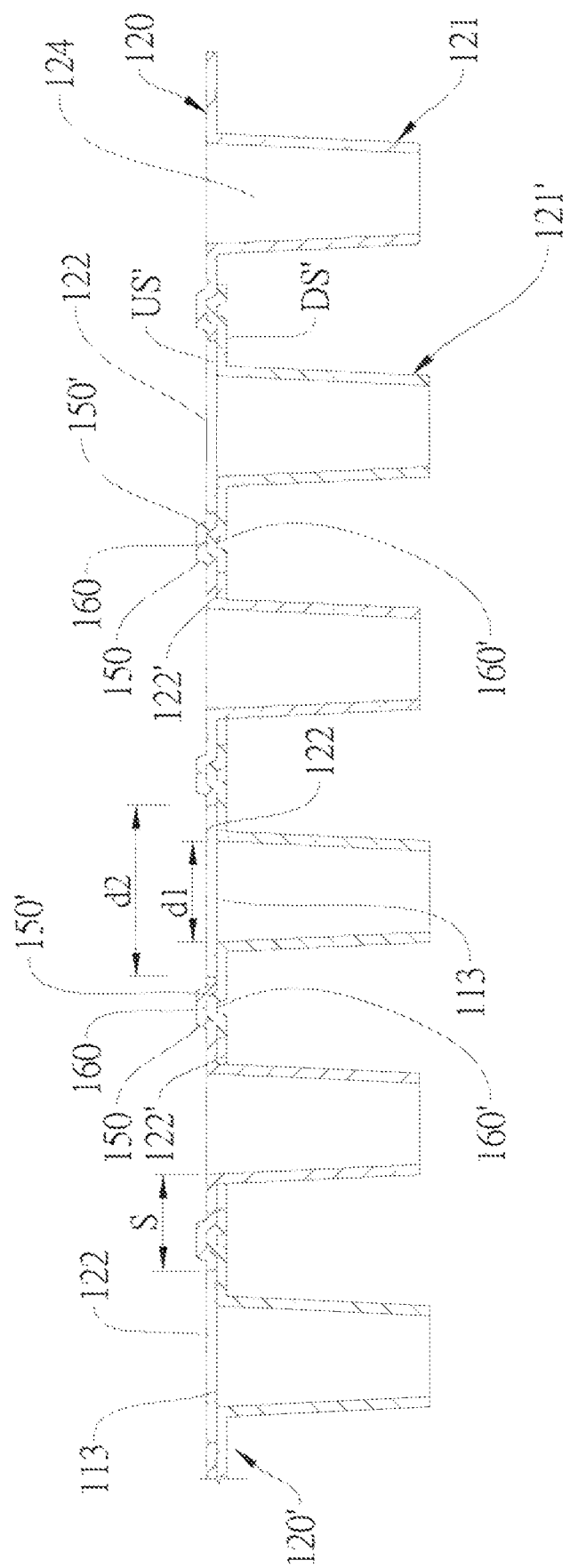
FIG. 4 is a schematic diagram showing device bodies according to the preferred embodiment of the present disclosure after being stacked.
Figure 5:
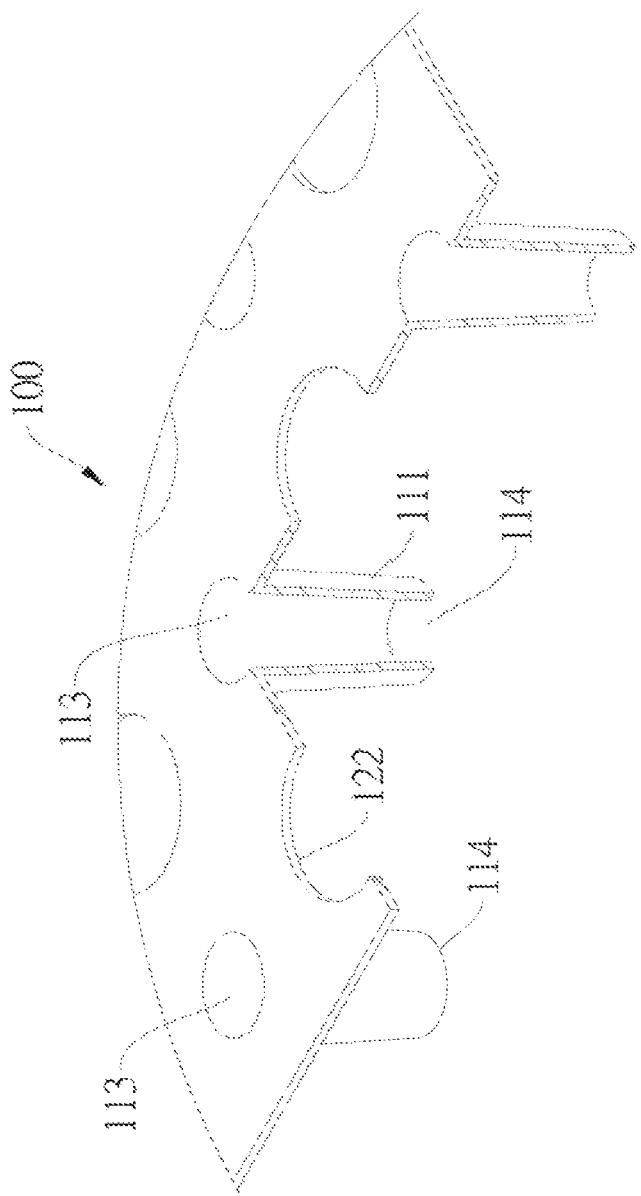
FIG. 5 is an enlarged view of partial of a stackable raising seedling device according to the preferred embodiment of the present disclosure.

Refer to FIG. 4, each of the raising seeding hole pans 121 of the device body 120 is corresponding to the corresponding one hole 122' of the other one device body 120'. The planted crops can be placed in the raising seeding hole parts 121, 121'. When using, each raising seeding hole part 121 of the device body 120 is inserted into the corresponding hole 122' of the other one device body 120'. Since the aperture of the raising seeding hole part 121 is less than that of the hole 122', and the raising seeding hole part 121 of the device body 120 and the hole 122 have a spacing S therebetween. The spacing S can be used as the engaging edge, that is, the spacing S of the device body 120 partially covers the periphery of hole 122' of the device body 120', thus making each of the raising seeding hole parts 121 of the device body 120 be completely inserted in the corresponding one hole 122' of the device body 120' and located on the position of the bottom surface DS' of the device body 120' Further, each of the openings 124 of the device body 120 is located on the position of the top surface US' of the device body 120', and Each of the raising seeding hole parts 121 in the device body 120 is communicated to the corresponding one hole 122' in the device body 120'. According to this, two identical device bodies 120 and 120' are overlapped with each other, which can not only centralize management and transportation, but also achieve the most efficient use of the area.

Figure 3:
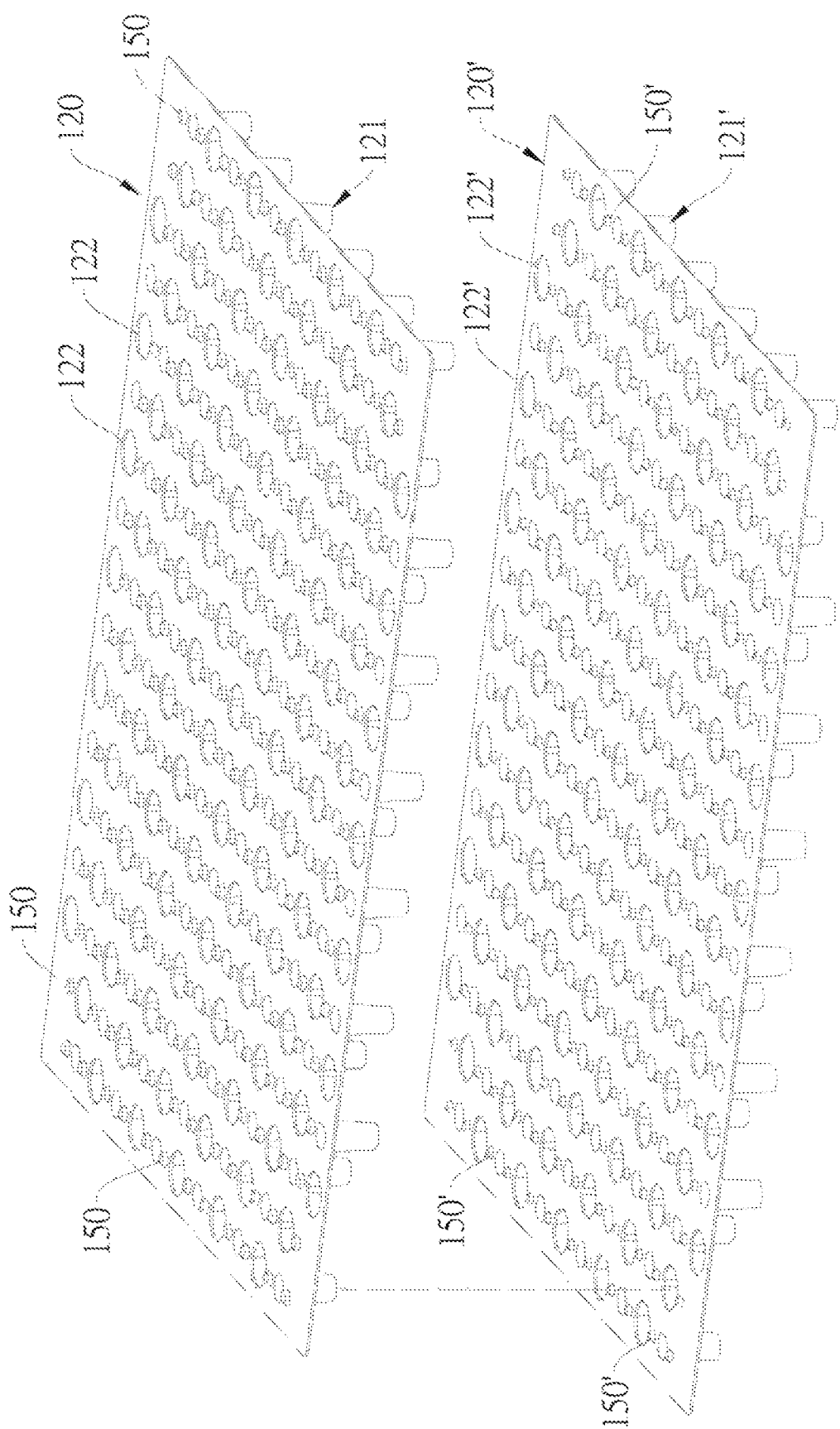
FIG. 3 is a schematic diagram showing device bodies according to the preferred embodiment of the present disclosure before being stacked.

Refer to FIG. 3 and FIG. 4, the top surface US further has at least a first alignment part 150, the bottom surface further has at least a second alignment part 160, and the first alignment part 150 can be precisely aligned and connected to the second alignment part 160. When the device body 120 is stacked on or under the other one device body 120' and shifted with the other one device body 120' along the first direction L1 or the second direction L2, the first alignment part 150 and the second alignment part 160 can enhance the accuracy of stacking and shifting the device bodies 120 and 120'. In one embodiment of the present disclosure, the first alignment part 150 is a protruding part while the second alignment part 160 is a concave part which can be engaged into the corresponding protruding part. As shown in FIG. 4, the device body 120 has the first alignment part 150 and the second alignment part 160. The device body 120' has the first alignment part 150' and the second alignment part 160'. The second alignment part 160 of the device body 120 is correspondingly disposed to be engaged to the first alignment part 150' of the device body 120'.

Figure 6:
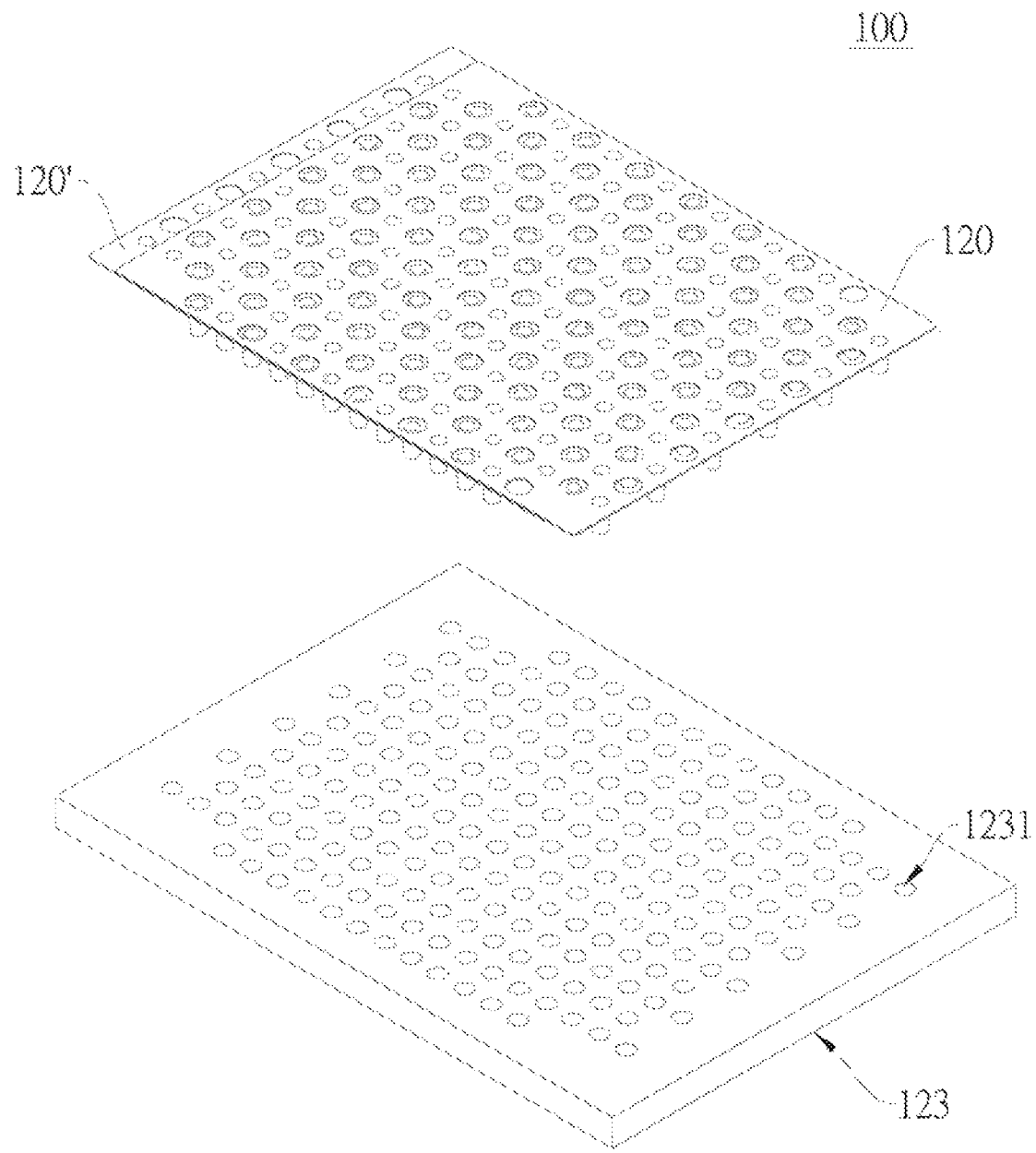
FIG. 6 is a schematic diagram showing a stackable raising seedling device according to the preferred embodiment of the present disclosure before being stacked.
Figure 7:
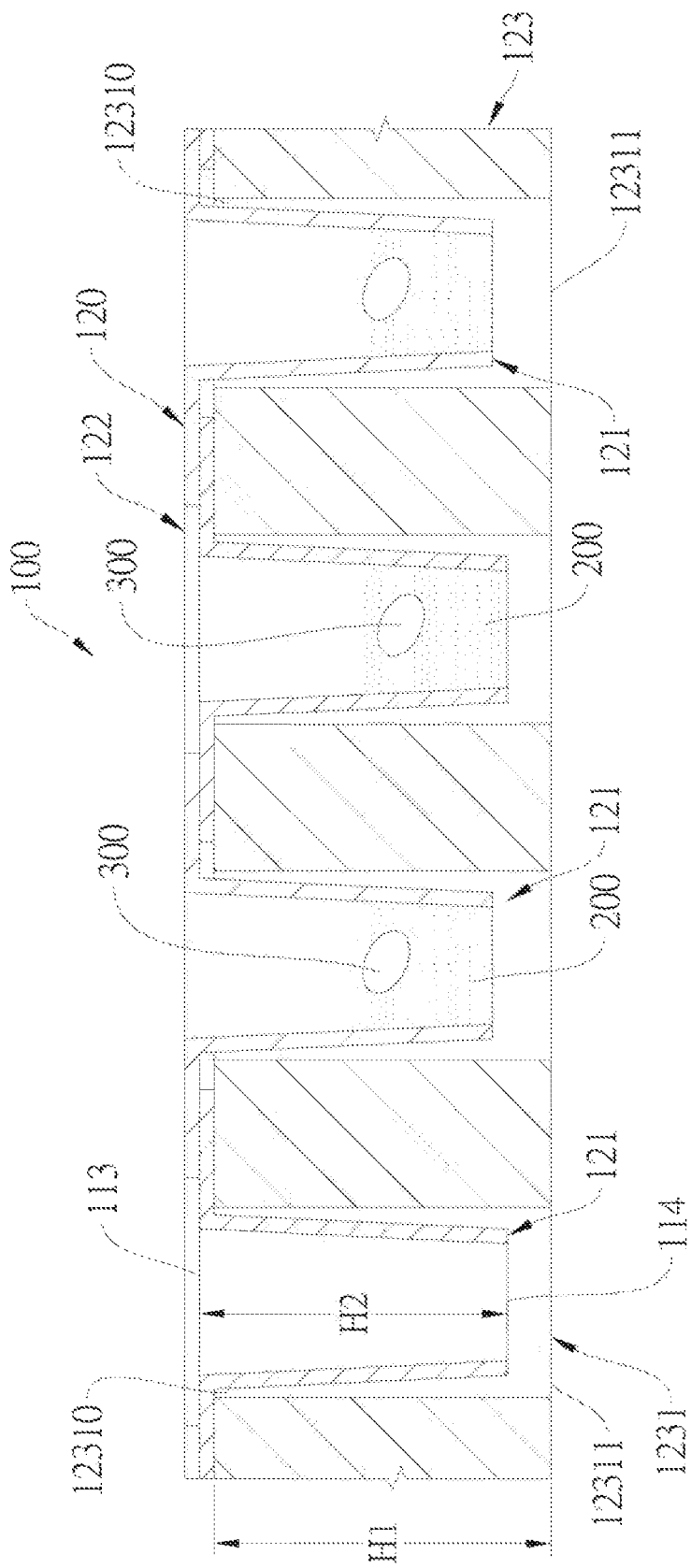
FIG. 7 is a schematic diagram showing a stackable raising seedling device according to the preferred embodiment of the present disclosure after being stacked.
Figure 8:
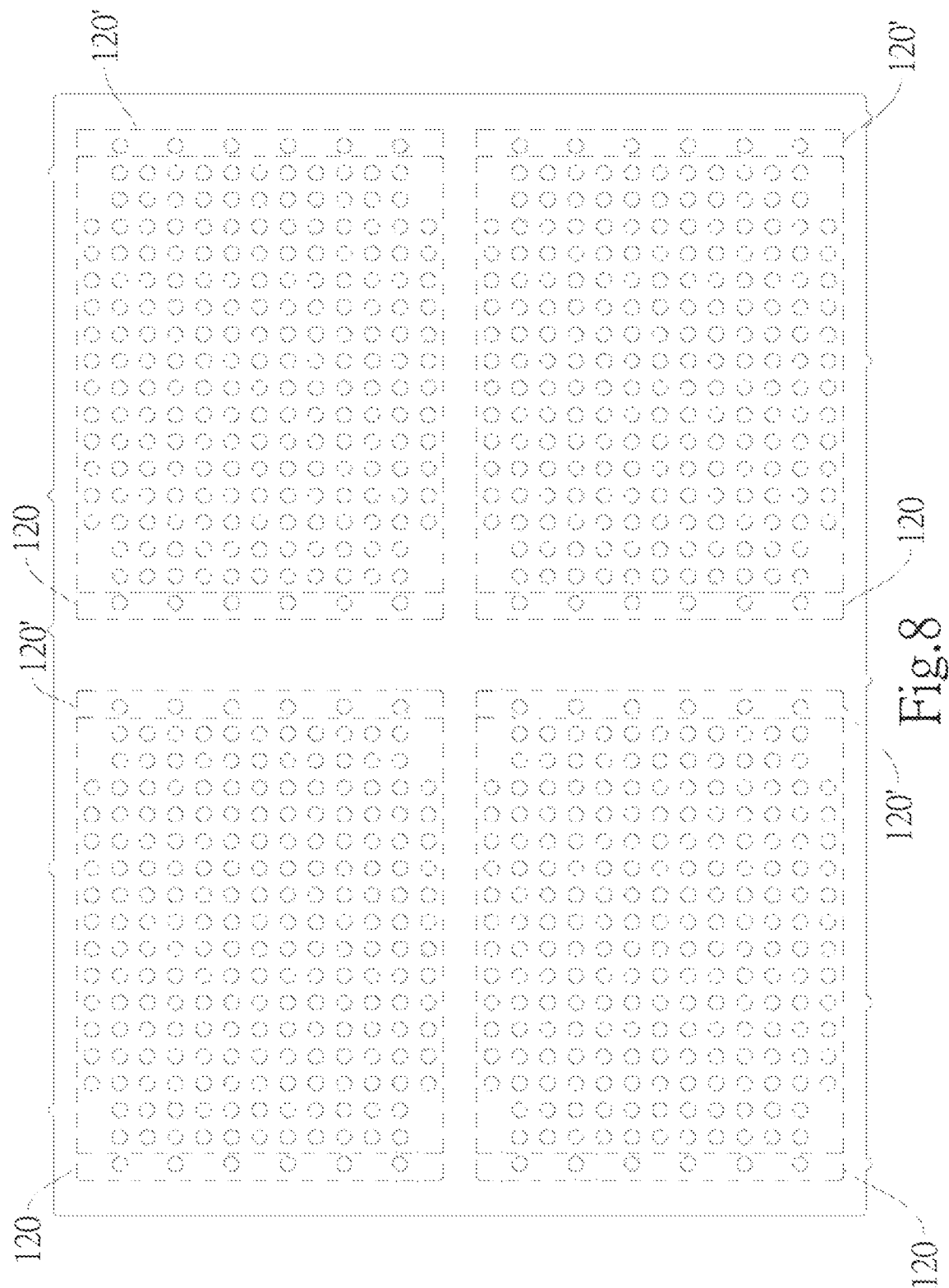
FIG. 8 is a schematic diagram showing an usage of planting plant seedlings according to the preferred embodiment of the present disclosure.

Refer to FIG. 6 and FIG. 7, and the stackable raising seedling device 100 can further comprises a floating planting board 123. The stackable raising seedling device 100 has perforations 1231 disposed at intervals. Each of the raising seeding hole parts 121 is placed in the corresponding perforation 1231, the perforation 1231 has a top perforation 12310 and a bottom perforation 12311, the bottom perforation 12311 is opposite to the top perforation 12310 and extended from one end of the top perforation 12310, a distance between the top perforation 12310 and the bottom perforation 12311 is defined as a first depth H1, a distance between the top hole 113 and the bottom hole 114 is defined as a second depth H2, and the first depth H1 is larger than the second depth H2. When the raising seeding hole part 121 is overlapped and placed on the floating planting board 123, since the first depth H1 is greater than the second depth H2, there is a gap between the floating planting board 123 and the bottom hole 114 of the raising seeding hole part 121 to form an air chamber, and the air chamber can provide air circulation. The stackable raising seedling device 100 can be installed on a crop cistern. The crop cistern can contain liquid. The liquid can be water or water with plant growth nutrient. The floating planting board 123 can be materials with a density lower than that of liquid, and the present disclosure is not limited thereto. The floating planting board 123 of the present disclosure can be a styrofoam board. When the stackable raising seedling device 100 is placed in a crop cistern with liquid, the floating planting board 123 will provide buoyancy to make the device body 120 float on the liquid, so that part of the roots of the planted crops can pass through the culture medium layer 20 to absorb the liquid of the crop cistern. The air cell formed by making the first depth H1 be greater than the second depth H2 can also facilitate the respiration of the roots of planted crops. In an embodiment of the present disclosure, as shown in FIG. 8, the stackable raising seedling devices 100 of the embodiment in FIG. 6 can be combined to a piece to achieve the advantages of mass production and lower production costs. The stackable raising seedling device 100 can also be equipped with a liquid supply device, which can contain liquid. The liquid can be water or water with plant growth nutrient. The liquid supply device can be exemplified but not limited to a sprinkler, a water droplet pot, or a regulator into which the plant growth nutrient is injected. When the liquid supply device is the sprinkler, the sprinkler can be set on the upper surface US and sprinkle water. The sprinkler can cool the ambient temperature, increase the ambient humidity or increase the humidity of the culture medium layer 20 to create a growing environment suitable for planting crops.

Figure 23:
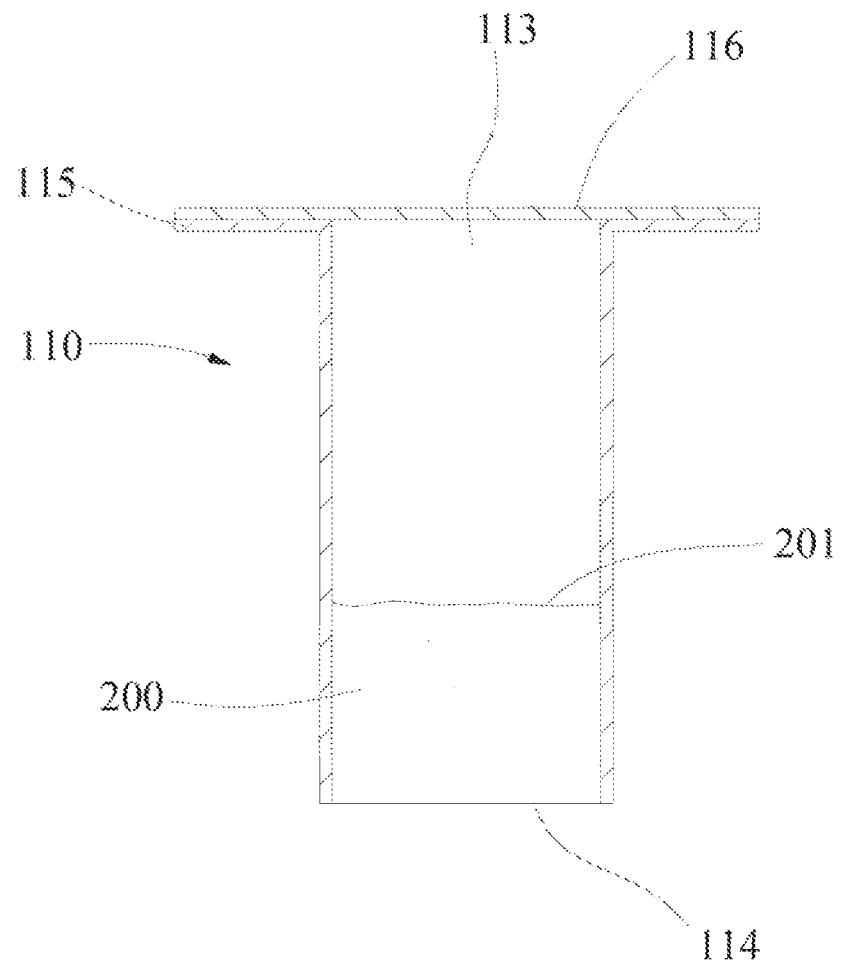
FIG. 23 is a schematic diagram showing a culture medium structure according to an embodiment of the present disclosure.

Referring to FIG. 23, the raising seeding hole part 121 can receive a culture medium layer 20. The culture medium layer 20 comprises an agar gel 203, and the agar gel 203 is composed of a plain growth nutrient, agar powder and water. The solid agar gel is used to maintain a fixed ratio of plant growth nutrient and prevent the nutrient solution used in hydroponic cultivation from continuously accumulating A method of preparing the agar gel 203 comprises steps of: (S10) mixing and dissolving the plant growth nutrient in the water to form a plant growth nutrient solution; (S11) adjusting a pH of the plant growth nutrient solution to be 6.0; (S12) adding the agar powder in the plant growth nutrient solution and hearing the plant growth nutrient solution until the agar powder has been dissolved, so as to form an agar solution 202; (S13) preparing the raising seeding hole part 121 and disposing the raising seeding hole part 121 on a freezing plate with a freezing temperature, and (S14) adding the agar solution 202 of a predetermined volume in the raising seeding hole part 121 and freezing the agar solution 202 to a cooling temperature, so as to form the agar gel 203. When implementing, the device body 120 of the stackable raising seedling device 100 of the present disclosure can directly produce the required culture medium layer 20 through the preparation steps of the agar gel, without the need to separately produce the culture medium layer 20 and then place it in the raising seeding hole part 121, so as to simplify the complicated process and improve the work efficiency and ease of use. However, in the present disclosure, the culture medium layer 20 can be separately prepared according to the needs of users, and then placed in the raising seeding hole part 121 to achieve customization.

Figure 25:
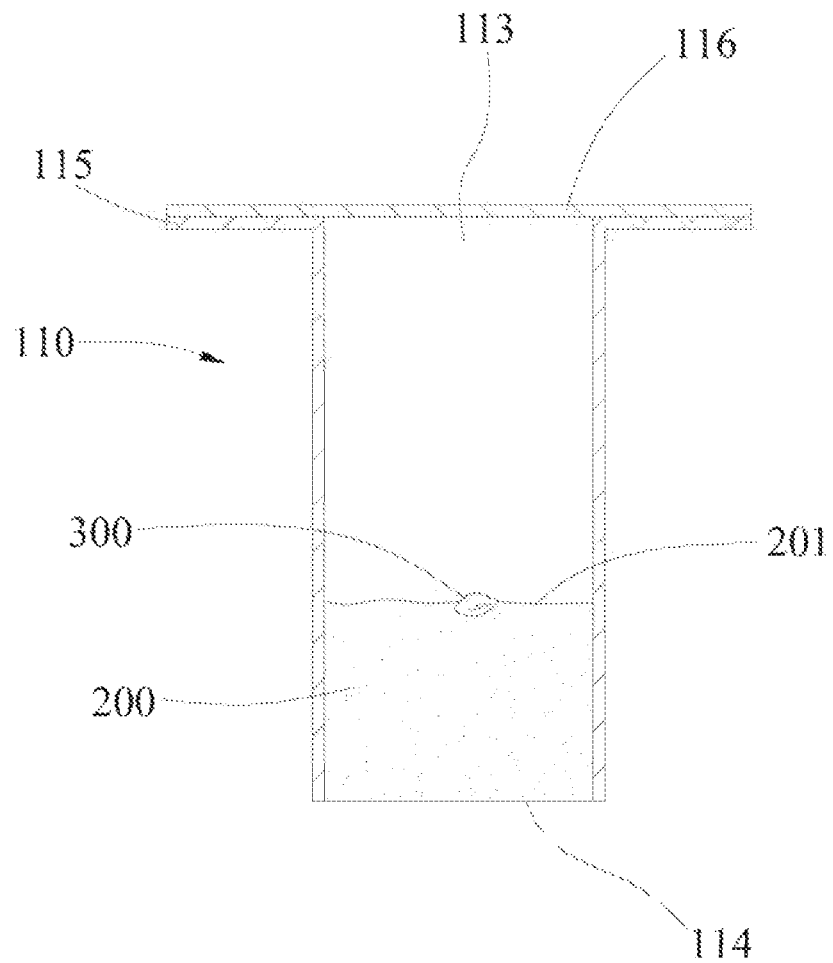
FIG. 25 is a schematic diagram showing another one step of a culture medium structure usage method according to an embodiment of the present disclosure.

Referring to FIG. 25, in one embodiment of the present disclosure, the stackable raising seedling device 100 further comprises a water-retaining film 116 disposed to cover the top hole 113. The water-retaining film 116 can be used to reduce the evaporation of water in the culture medium layer 20 and keep the culture medium layer 20 a certain amount of moisture.

In one embodiment of the present disclosure, the stackable raising seedling device 100 further comprises light shielding part, disposed to cover the top hole 113. The light shielding part is a light shielding net with holes or a light shielding cloth without holes, and the present disclosure is not limited thereto. The light shielding part can be made of transparent or opaque materials. The light shielding part can prevent the strong light from being directly irradiated, and ensure that the right amount of light is irradiated to the planted crops. On the other hand, the light shielding pan can also be completely shaded to control the growth period and growth rate of planted crops. The growth period of planted crops can be further divided into long daylight plants, short-day plants, and neutral-day plants according to the critical day length and the length of light required for flowering.

Figure 9:
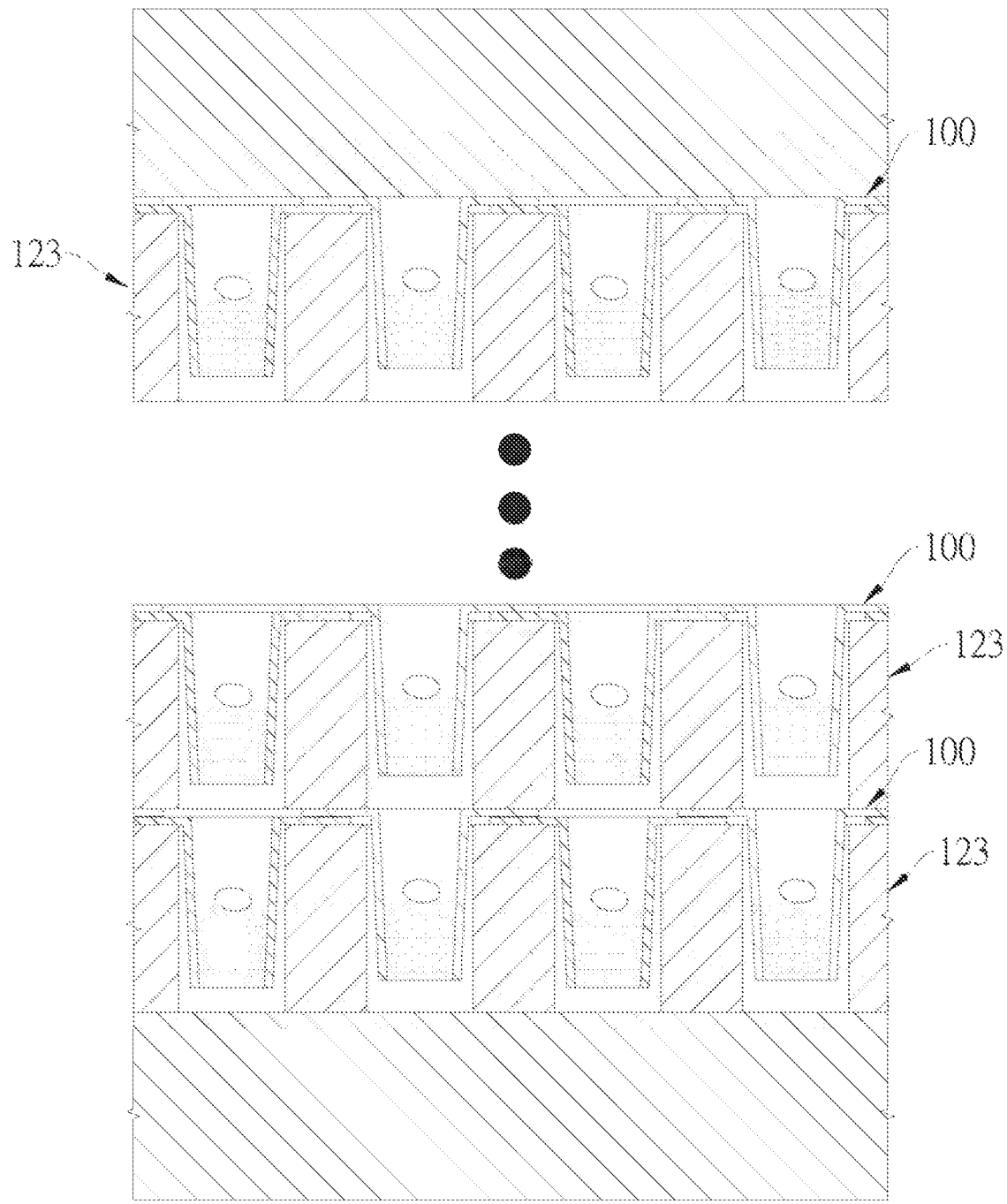
FIG. 9 is another one schematic diagram showing an usage of planting plant seedlings according to the preferred embodiment of the present disclosure.

Referring to FIG. 8 and FIG. 9, an objective of the present disclosure is further to provide a method of using the stackable raising seedling device 100. When the type of planted crop is the dark sprouting seed, the method of using the stackable raising seedling device 100 comprises steps of: stacking one of the stackable raising seedling devices 100 on or under another one of the stackable raising seedling devices 100 and shifting the one of the stackable raising seedling devices 100 with the other one of the stackable raising seedling devices 100 along the first direction L1 or the second direction L2; disposing a vegetable seed 300 on a surface of the culture medium layer 20 or in the culture medium layer 20; disposing the stackable raising seedling devices 100 on the floating planting board 123; stacking one of the floating planting boards 123 on or under another one of the floating planting hoards 123; and disposing the stacked floating planting boards 123 in a darkroom to control the growth period and growth rate of planted crops. When implementing, the overlapping setting by stacking and shifting the stackable raising seedling devices 100 can also be used to make the overlapped floating planting board 123 shade light to achieve a darkroom-like effect, so as to reduce the number of shading cloths used in hydroponic cultivation in the past, and save labor and time costs.

An objective of the present disclosure is further to provide a method of using the stackable raising seedling device 100 when the type of planted crop is the light sprouting seed, and the method of using the stackable raising seedling device 100 comprises steps of: stacking one of the stackable raising seedling devices 100 on or under another one of the stackable raising seedling devices 100 and shifting the one of the stackable raising seedling devices 100 with the other one of the stackable raising seedling devices 100 along the first direction L1 or the second direction L2; disposing a vegetable seed 300 on a surface of the culture medium layer 20 or in the culture medium layer 20; disposing the stackable raising seedling devices 100 on the floating planting board 123; and disposing the floating planting board 123 on a crop cistern which contains liquid to make the roots of planted crops be able to penetrate the bottom hole 114 and absorb liquid on the crop cistern during the growth process.

Refer to FIG. 111, after stacking one of the stackable raising seedling devices 100 on or under another one of the stackable raising seedling devices 100 and shilling the one of the stackable raising seedling devices 100 with the other one of the stackable raising seedling devices 100 along the first direction L1 or the second direction L2, and then placing the stackable raising seedling devices 100 on the floating planting board 123, a vegetable seed 300 is placed on the culture medium layer 20 during the sowing period. Then, the vegetable seed 300 is waiting to germinate during the seedling period, and next, when the seedlings of the planted crops grow to a certain size, disassemble the stacked stackable raising seedling devices 100 and place them separately to increase the distance between the holes 122 and 122' of the device bodies 120 and 120' during the seedling period, so that the seedlings of planted crops have enough space to grow to avoid the entanglement of the stems and leaves of adjacent seedlings, which will affect the growth and health of the seedlings.

In this embodiment, after the device body 120 and the device body 120' overlap and shift with each other by stacking and shifting the stackable raising seedling devices 100, the distance between the raising seeding hole parts 121, 121' is relatively short, and each of the raising seeding hole parts 121, 121' is used for placing planting crops, so it is suitable for the stage where the overall size of the planted crop is small in the initial growth stage, and when the planted crop grows to a larger size, live device body 120 and the device body 120' can be separated.

When the planted crop grows to a larger size, in order to avoid the entanglement of the stems and leaves of the adjacent planted crops, the device body 120 and the device body 120' can be directly separated and placed in the required planting environment space. In this way, the adjacent distribution of each raising seeding hole part 121 of the device body 120 is hole 122, so that the distance between the raising seeding hole parts 121 becomes larger, which can be suitable for planting crops to grow to a larger size; similarly, the device The distance between the raising seeding hole parts 121' of the body 120' becomes larger, which can be suitable for planting crops to grow to a larger size.

Figure 11:
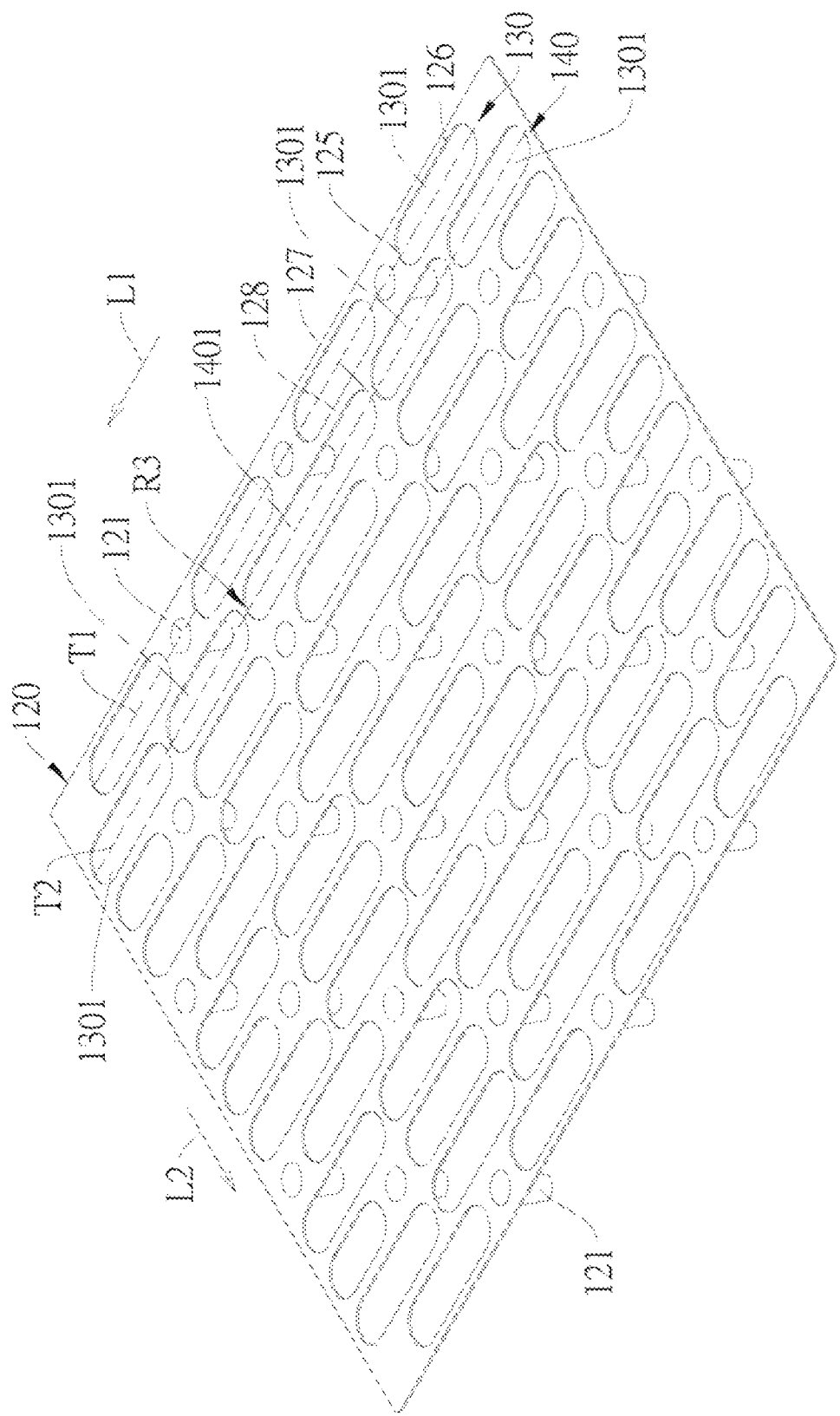
FIG. 11 is a whole structure diagram of a device body according to another one preferred embodiment of the present disclosure
Figure 12:
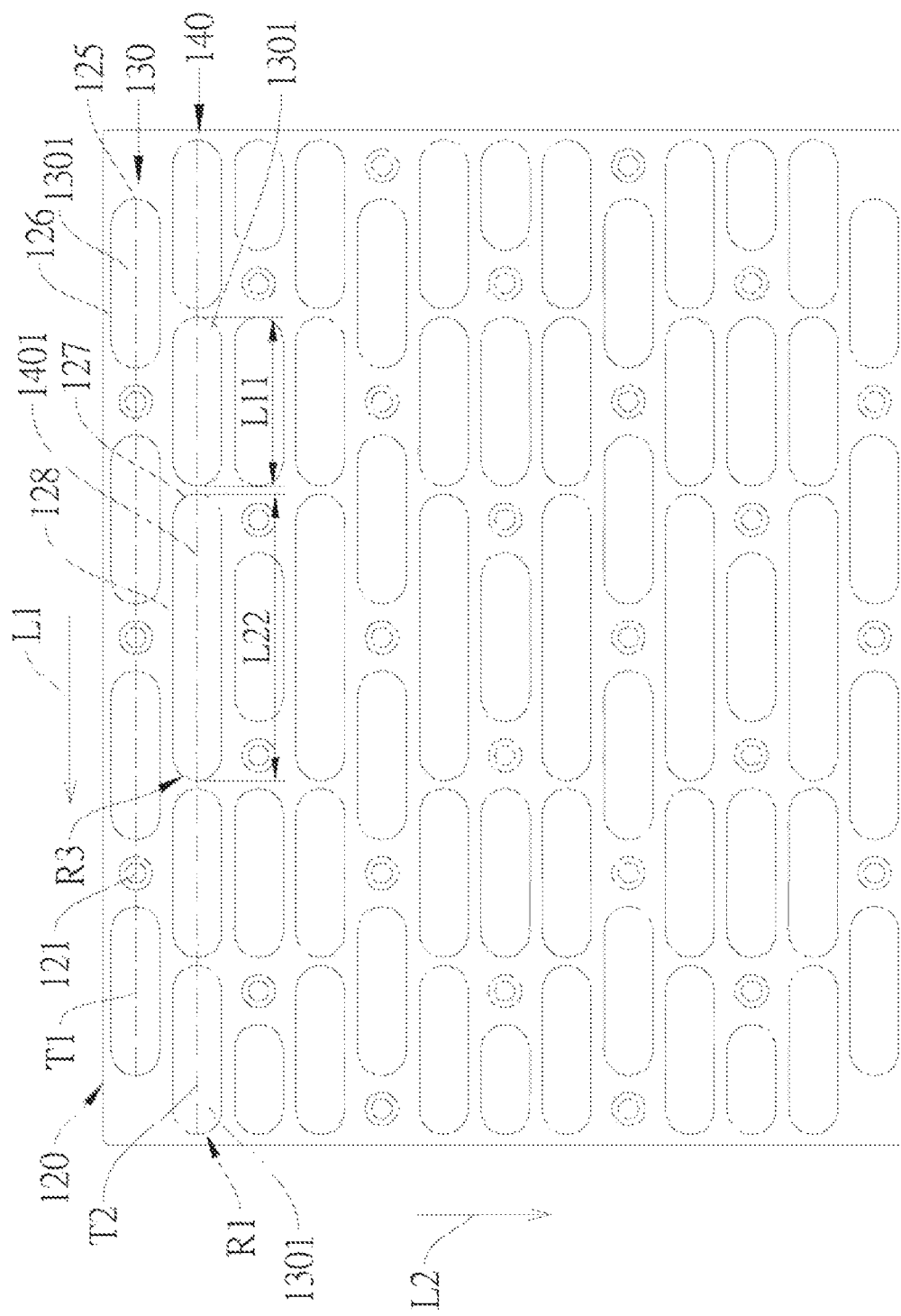
FIG. 12 is another one whole structure diagram of a device body according to the other one preferred embodiment of the present disclosure.
Figure 13:
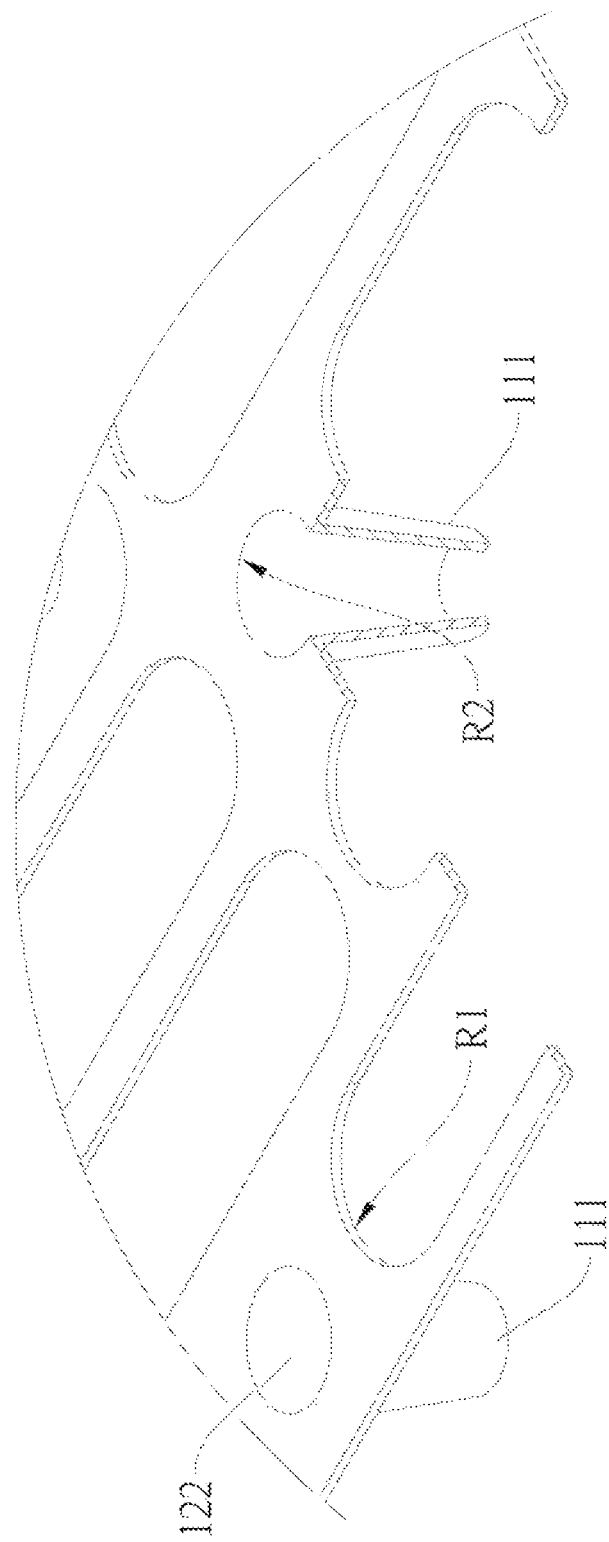
FIG. 13 is an enlarged view of partial of a device body according to the other one preferred embodiment of the present disclosure.

Referring to FIG. 11 through FIG. 13, an objective of another one preferred embodiment of the present disclosure is to provide a stackable raising seedling device which comprises a device body and a floating planting board. Partial features of the stackable raising seedling device in the other one preferred embodiment are the same as those of the stackable raising seedling device in the preferred embodiment, and the same features are not described again.

The raising seeding hole parts 121 are disposed on the device body 120, and first hole groups 130 are disposed on the device body 120. Each of the first hole groups 130 is corresponding to one of raising seeding hole pans 121' of another one stackable raising seedling device 120'. The raising seeding hole parts 121 and the first hole group 130 are staggered with each other along a first direction L1 to form the first hole groups 130 of at least one row. The stackable raising seedling device 100 further comprises at least one second hole group 140 of a row, the at least one second hole group 140 and the at least one first hole group 130 are arranged adjacently. The at least one second hole group 140 comprises the first holes 1301 and at least one second hole 1401, the first holes 1301 and the at least one second hole 1401 are arranged adjacent to each other along the first direction L1, and the second hole 1401 is corresponding the raising seeding hole parts 121' of the other one stackable raising seedling device 120'. The first hole group 130 is defined by two opposite first semicircle edges 125 and two opposite first linear edges 126 connected to the first semicircle edges 125, and the raising seeding hole part 121 is defined by a cycle edge. The radius of the cycle edge is R2.

Figure 14:
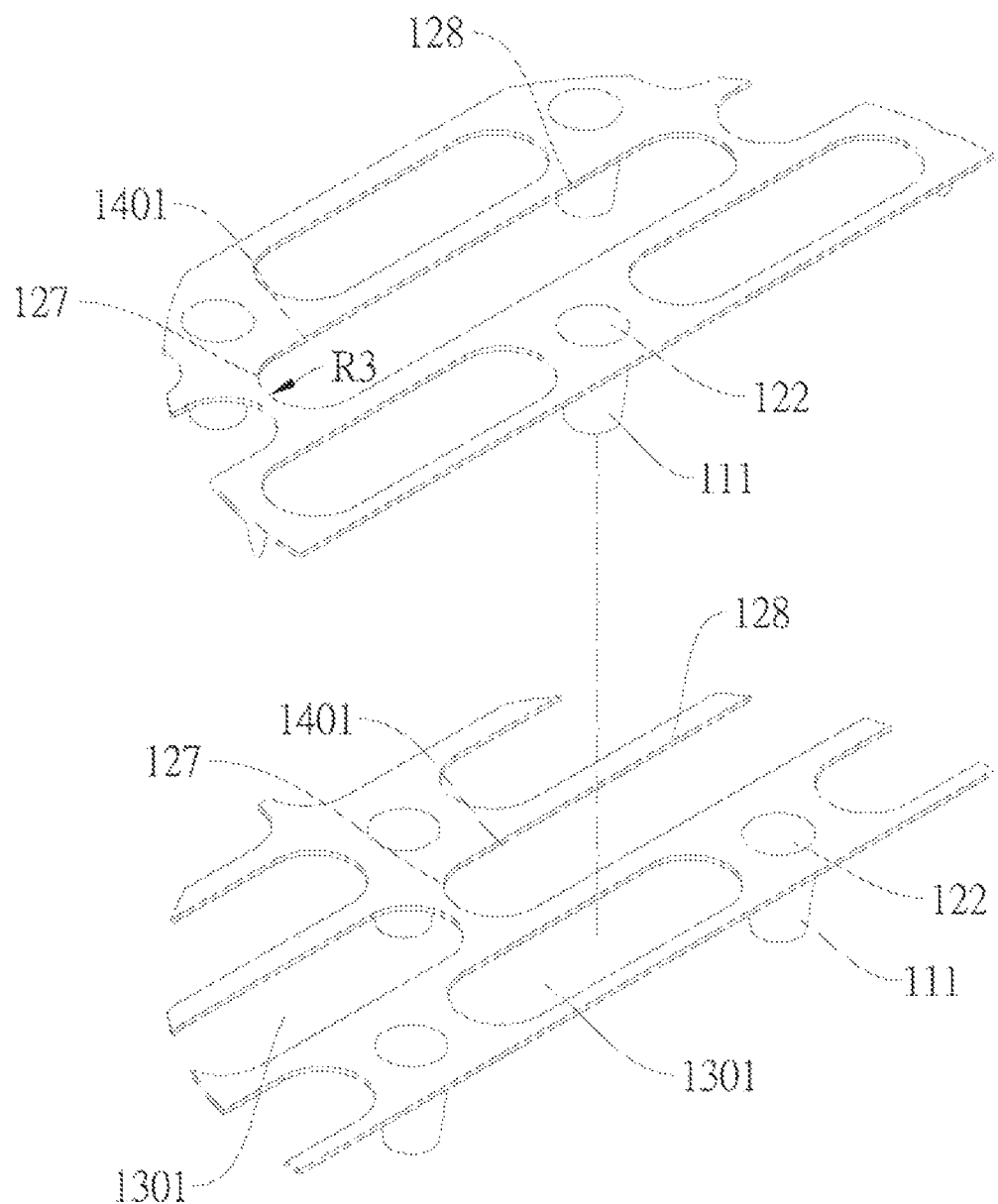
FIG. 14 is an enlarged view of partial of a device body according to the other one preferred embodiment of the present disclosure before being stacked.
Figure 15:
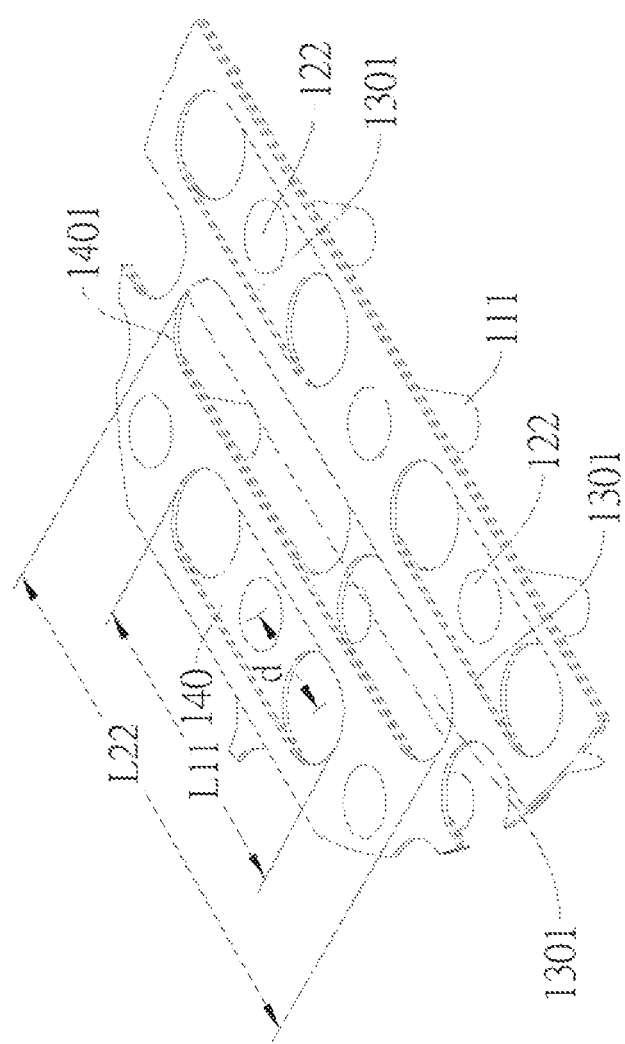
FIG. 15 is an enlarged view of partial of a device body according to the other one preferred embodiment of the present disclosure after being stacked.

Referring to FIG. 14 and FIG. 15, the at least one second hole 1401 is defined by a connection of the two opposite second semicircle edges 127 and the two opposite second linear edges 128. After the stackable raising seedling devices 100 are stacked, centers of any two holes 122 have a minimum distance d therebetween. A length of the first hole 1301 is defined by an equation. L11=2R1+(N1−1)d, wherein L11 is the length of the first hole 1301, N1 is a number of the holes 122 corresponding to the first hole 1301. The radius of tire first semicircle edge 125 of the first hole 1301 is R1. The length L11 of the first hole 1301 refers to the longitudinal distance between the two first semicircle edges 125 of the first hole 1301. The length of the first linear edge 126 is (N1−1)d. A distance from the center of the hole 122 to the center of a first semicircle edge 126 of the first hole 1301 is also the minimum distance d. The distance from the middle line T1 of the first hole group 130 to the middle line T2 of the second hole group 140 is also equal to the aforementioned minimum distance d. The radius of the second semicircle edge 127 of the second hole 1401 is R3. In this embodiment, R3=R1. In another embodiment. R3 may be larger than R1 or smaller than R1, depending on the design conditions. The length of the second hole 1401 is L22=2R3+(N2−1)d, where N2 is the number of holes 122 corresponding to the second hole 1401. In this embodiment. N1=3, N2=5, that is. N2>N1. In another embodiment, it may also be N2<N1.

Figure 16:
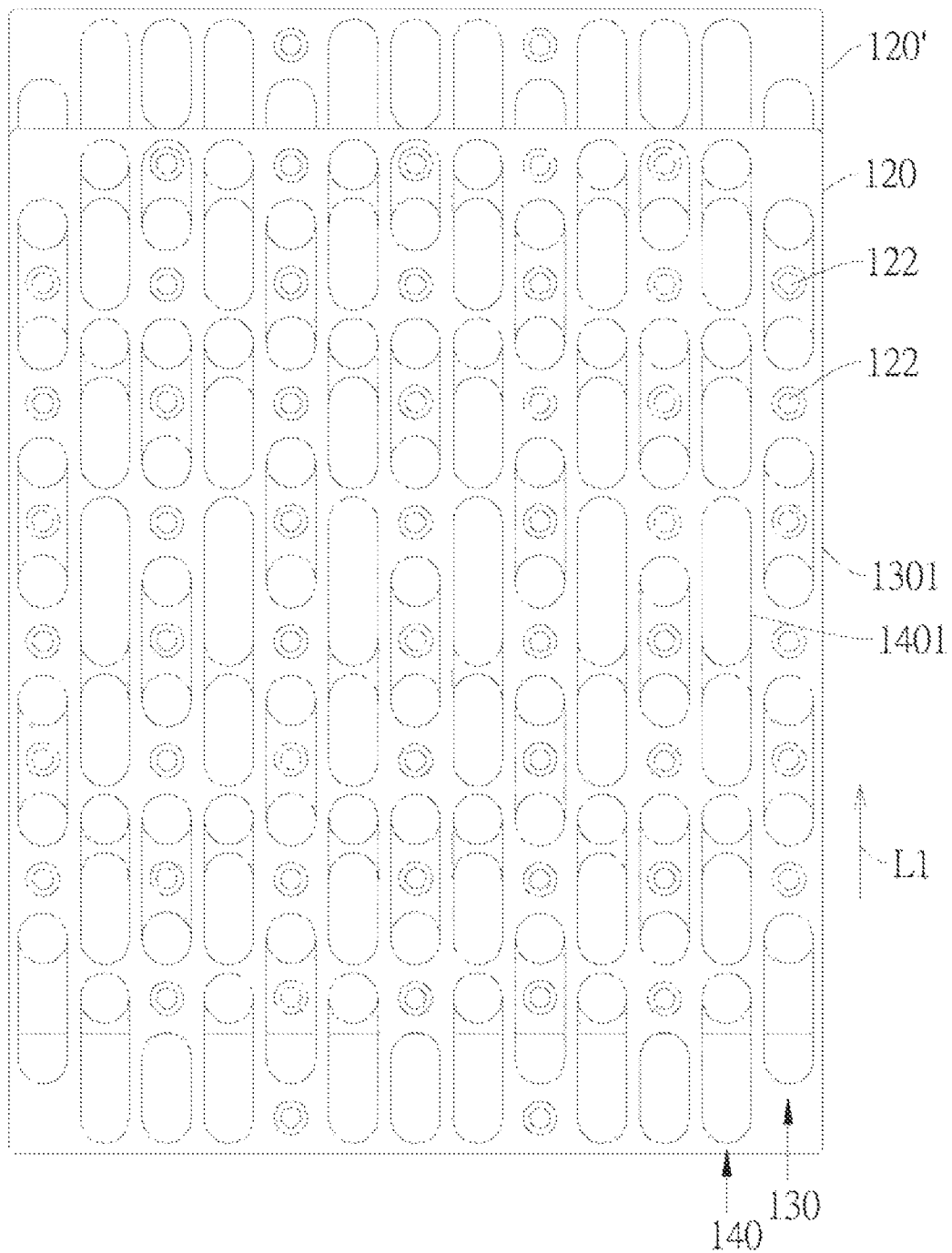
FIG. 16 is a schematic diagram showing device bodies according to the other one preferred embodiment of the present disclosure after being stacked.
Figure 17:
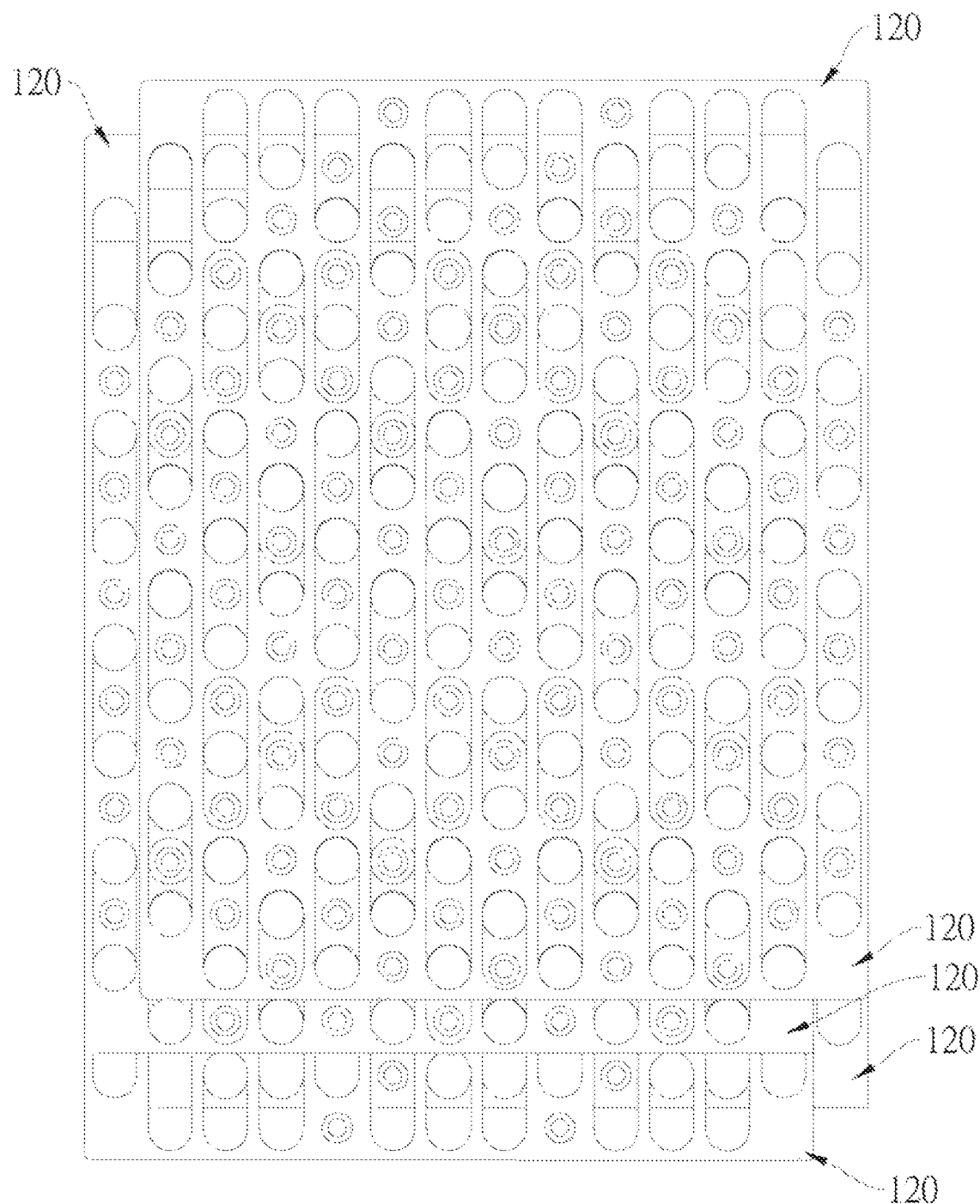
FIG. 17 is another one schematic diagram showing device bodies according to the other one preferred embodiment of the present disclosure after being stacked.
Figure 18:
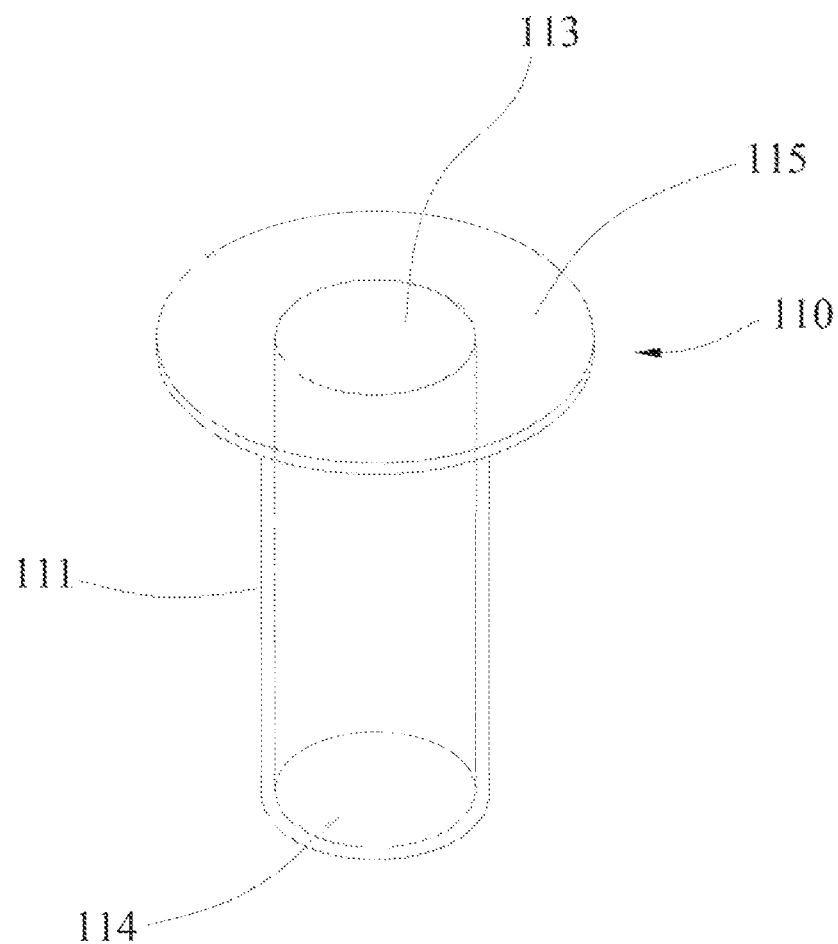
FIG. 18 is a schematic diagram showing a whole structure of a seeding board according to an embodiment of the present disclosure.
Figure 19A:
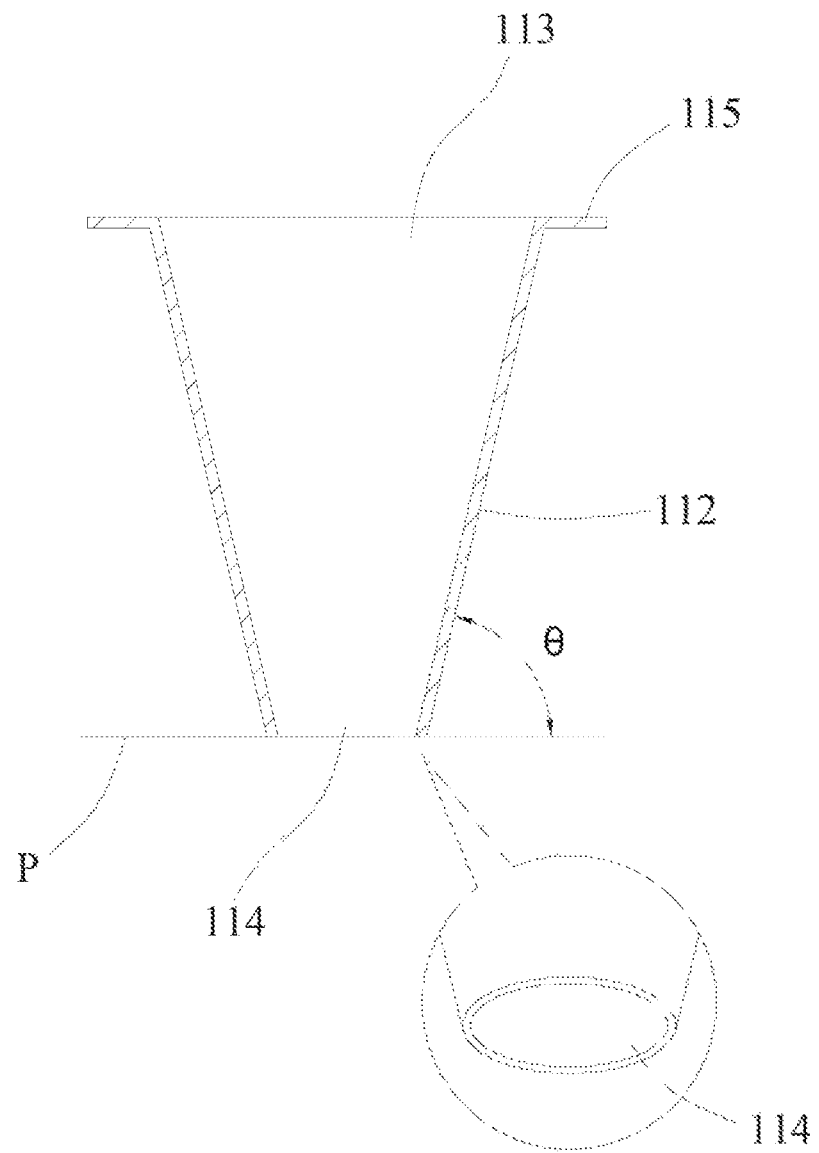
FIG. 19A is a schematic diagram showing a tilted angle of a seeding board according to an embodiment of the present disclosure.
Figure 19B:
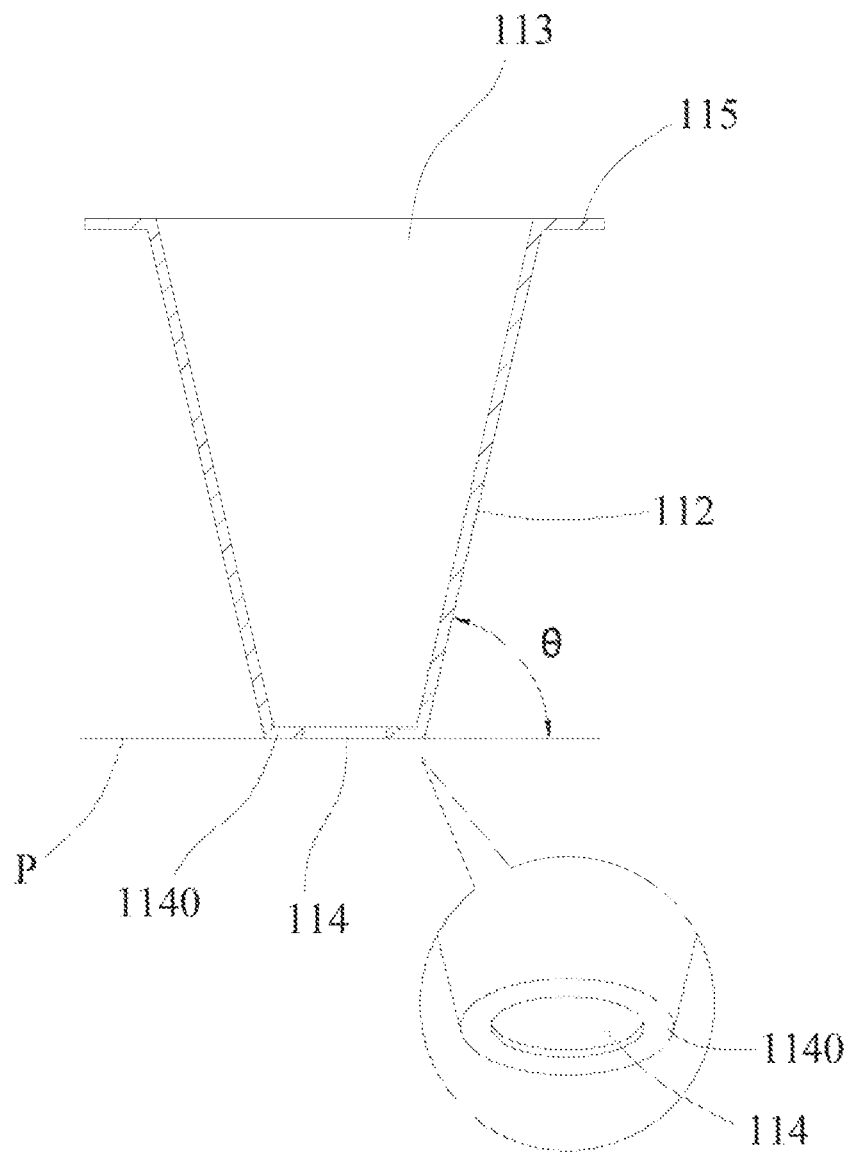
FIG. 19B is a schematic diagram showing a tilted angle according to another one embodiment of the present disclosure.
Figure 19C:
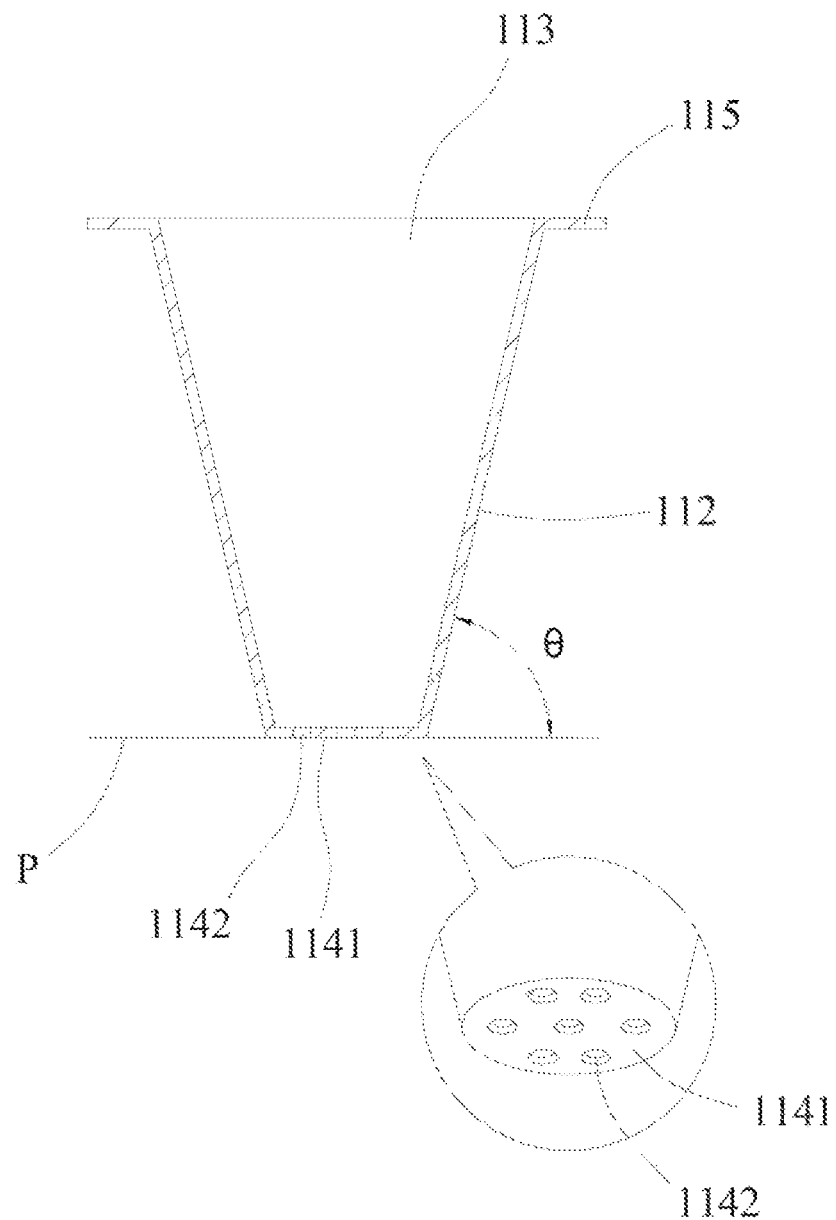
FIG. 19C is a schematic diagram showing a tilted angle according to another one embodiment of the present disclosure.

Referring to FIG. 16 and FIG. 17, the two device bodies 120 and 120' are stacked up and down, and the upper and lower holes 122 form a staggered configuration. The device bodies 120 and 120' are stacked on each other. The device body 120 and the device body 120' are superimposed and arranged in a staggered arrangement in the first direction L1, and the hole 122 of the device body 120 corresponds to the first hole 1301 of the first hole group 130 of the device body 120', and the hole 122 of the device body 120 corresponds to the center of the first hole 1301 of the device body 120'. As shown in FIG. 16, device bodies 120 are stacked up and down and by each other and arranged in a staggered manner Therefore, different stacked structures can be used for each growth stage of the planted crop. For example, in the seedling period of planted crops, due to the small size of the planted crops, the slacked structure shown in FIG. 17 can be used. After the planted crops gradually grow, when the seedling period is reached, part of the stackable seedling raising devices 100 can be separated, such as the stacking structure shown in FIG. 16, even after the planted crops grow larger, the seedling raising device can be separated and a single stackable raising seedling device 100 shown in FIG. 11 can be used.

The stackable raising seedling device of the present disclosure, by appropriately setting the long first hole and second hole, can form a variety of growing spaces with different spacings by stacking multiple stackable raising seedling devices, which can be adapted to different growth stages of the planted crops. In addition, there is no need to manually transplant the planted crops to different stages of planted crops. As long as the stackable raising seedling devices are separated, different spacings can be formed to match the different growth stages of the planted crops.

In summary, the present disclosure can be applied to the lop and bottom overlapping manner according to the growth stages of planted crops. For example, in the seedling stage of planted crops, due to the small size of the planted crops, the required spacing between the holes is not required to be too long, and it can provide enough growth space for planted crops, so the most efficient use of area structure design and configuration can be achieved in a planting tray with a limited seedling area. After the planted crops have gradually grown, when the seedlings are raised, the two overlapping device bodies can be disassembled to form a larger spacing between the holes, which can provide enough space for planted crops to grow. It achieves the effect of matching the different growth stages of planted crops, so as to solve the problem of manual transplantation to different planting trays at different growth stages of planted crops. Thus, the present disclosure does indeed simplify the complex process of transplantation to improve work efficiency and ease of use. Furthermore, when the planted crops have grown seedlings and need to be transplanted and cultivated in a larger space environment, it is convenient to directly transplant the entire unit seedlings to the cultivated land.

A main objective of the present disclosure is to provide a culture medium, in particular to, a culture medium is applied to the field of the plant culture, at least comprising an agar gel 203 (as shown in FIG. 6) which is composed of a plant growth nutrient, agar powder and water wherein the agar gel 203 is 100 wt % (weight percent). In implementations, the plant growth nutrient and the agar powder are mixed in the water and heated to be dissolved in the water, and then cooled down to form the agar gel 203. The plant growth nutrient is the nutrient component which is essential to the plant growth. The plant growth nutrient is composed of diammonium phosphate and potassium nitrate, wherein the agar powder is 0.5-2.5 wt %. In one embodiment of the present disclosure, the diammonium phosphate is 0.01-0.02 wt %, or the potassium nitrate is 0.05-0.1 wt %. In one embodiment of the present disclosure, the agar power is 1 wt %. In implementations, according to the size of the container of the culture medium and growth condition of the planted crop, the ratio of the plant growth nutrient in the agar gel 203 can be adjusted.

A main objective of the present disclosure is to provide a culture medium, at least comprising an agar gel 203 which is composed of a plant growth nutrient, agar powder and water wherein the agar gel 203 is 100 wt %, in implementations, the plant growth nutrient and the agar powder are mixed in the water and heated to be dissolved in the water, and then cooled down to form the agar gel 203. The plant growth nutrient is at least one or combination of twos selected from diammonium phosphate, potassium nitrate, calcium nitrate, magnesium sulphate, manganese (III) chloride, ferrous sulfate, boric acid, zinc sulfate, copper sulfate, ammonium molybdale and silicon dioxide. In implementations, according to the growth stage of the planted crop, the plant growth nutrient can be adjusted to enhance the specific growth ability of the planted crop, for example, enhancing photosynthesis, respiration, chlorophyll formation, nitrogen fixation, growth of rhizomes and leaves plant hardness, resistance to diseases and insect pests, or flowering and fruiting ability. The agar powder is 0.5-2.5 wt %. In one embodiment of the present disclosure, plant growth nutrient is at least one or combination of twos selected from the diammonium phosphate being 0.01-0.02 wt %, the potassium nitrate being 0.05-0.1 wt %, the calcium nitrate being 0.05-0.1 wt %, the magnesium sulphate being 0.03-0.05 wt %, the manganese (III) chloride being 0.00015-0.0003 wt %, the ferrous sulfate being 0.002-0.004 wt %, the boric acid being 0.0001-0.0003 wt %, the zinc sulfate being 0.00002-0.00004 wt %, the copper sulfate being 0.00002-0.00004 wt %, the ammonium molybdate being 0.000001-0.000002 wt %, and the silicon dioxide being 0.00001-0.00002 wt %, in one embodiment of the present disclosure, the agar power is 1 wt %. In implementations, according to the size of the container of the culture medium and growth condition of the planted crop, the ratio of the plant growth nutrient in the agar gel 203 can be adjusted to enhance the specific growth ability of the planted crop, for example, enhancing photosynthesis, respiration, chlorophyll formation, nitrogen fixation, growth of rhizomes and leaves plant hardness, resistance to diseases and insect pests, or flowering and fruiting ability.

Figure 20:
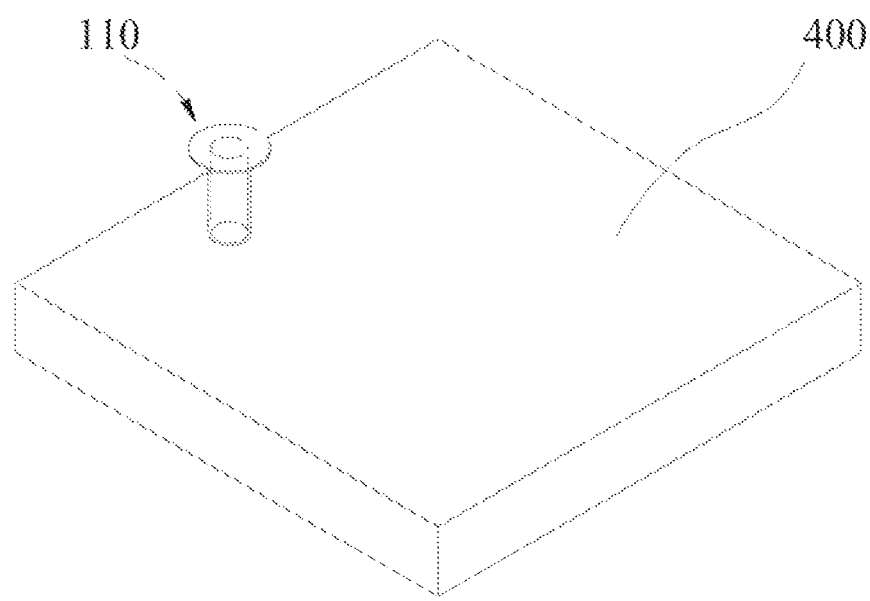
FIG. 20 is a schematic diagram showing one step of a culture medium manufacturing method according to an embodiment of the present disclosure.
Figure 21:
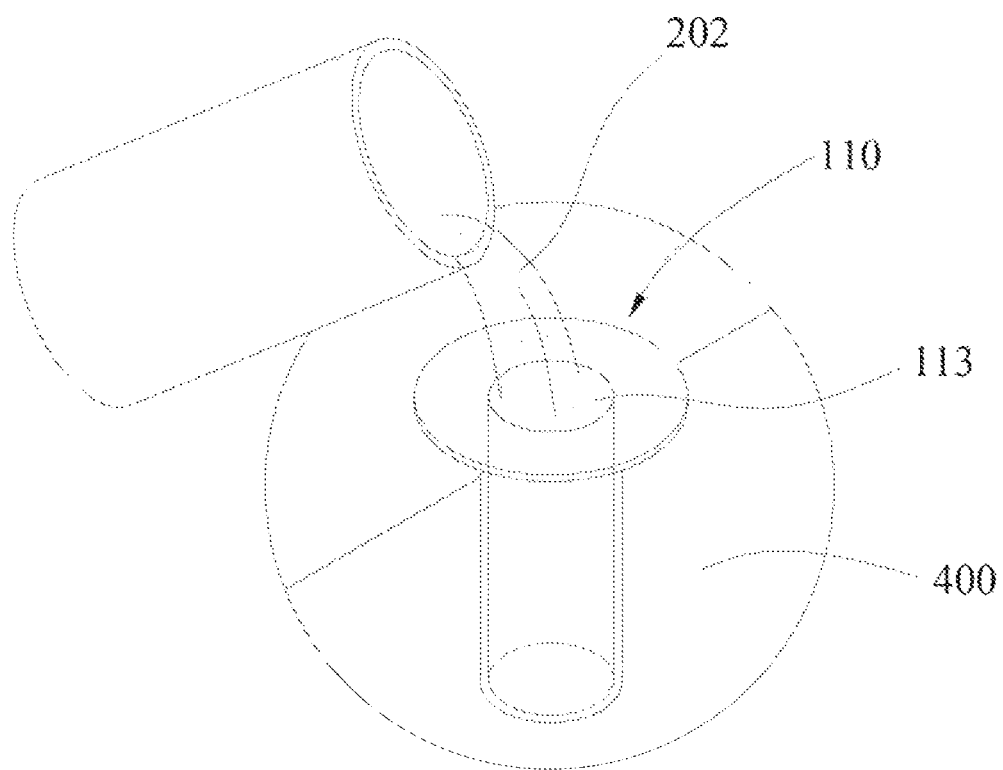
FIG. 21 is a schematic diagram showing another one step of a culture medium manufacturing method according to an embodiment of the present disclosure.
Figure 22:
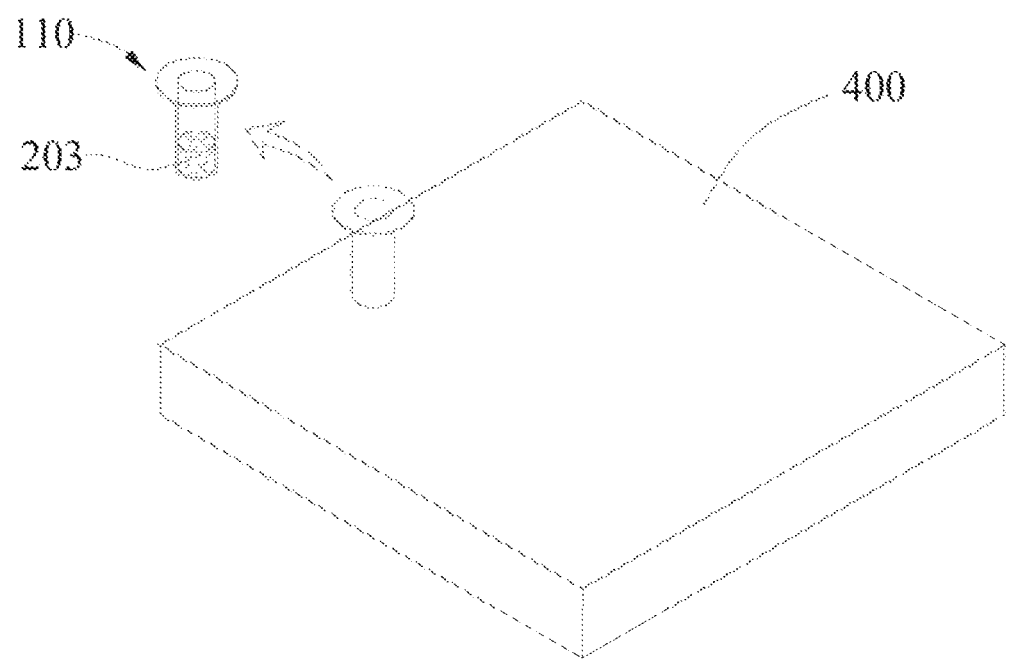
FIG. 22 is a schematic diagram showing another one step of a culture medium manufacturing method according to an embodiment of the present disclosure.
Figure 24:
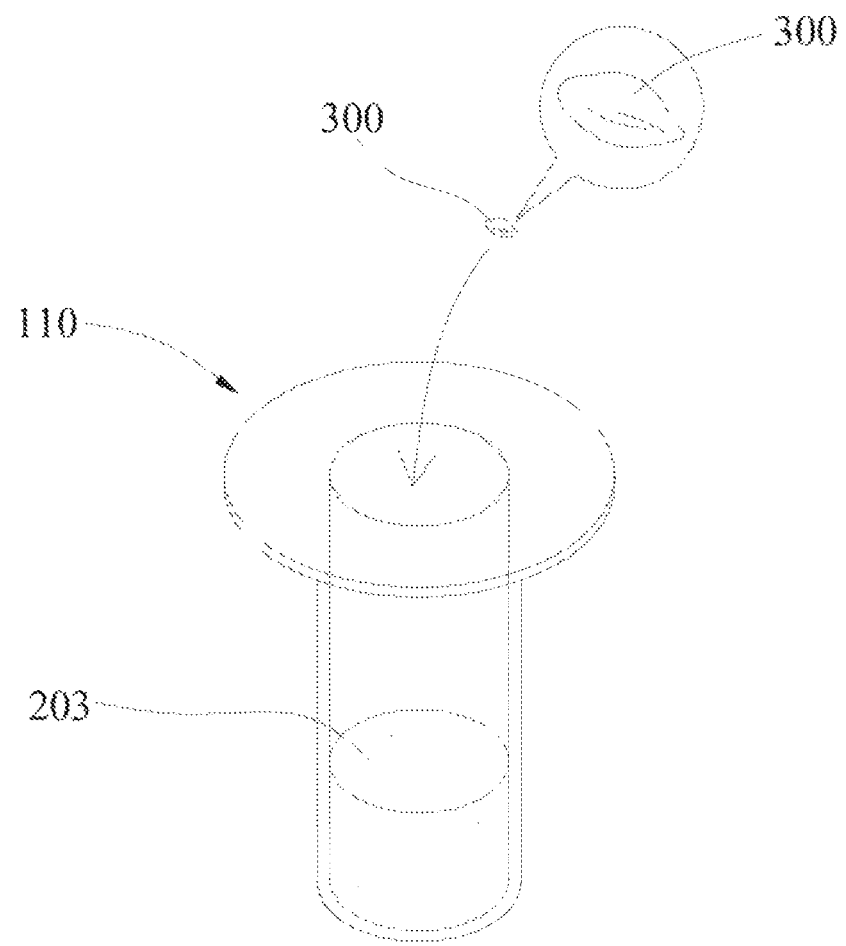
FIG. 24 is a schematic diagram showing one step of a culture medium structure usage method according to an embodiment of the present disclosure.
Figure 27:
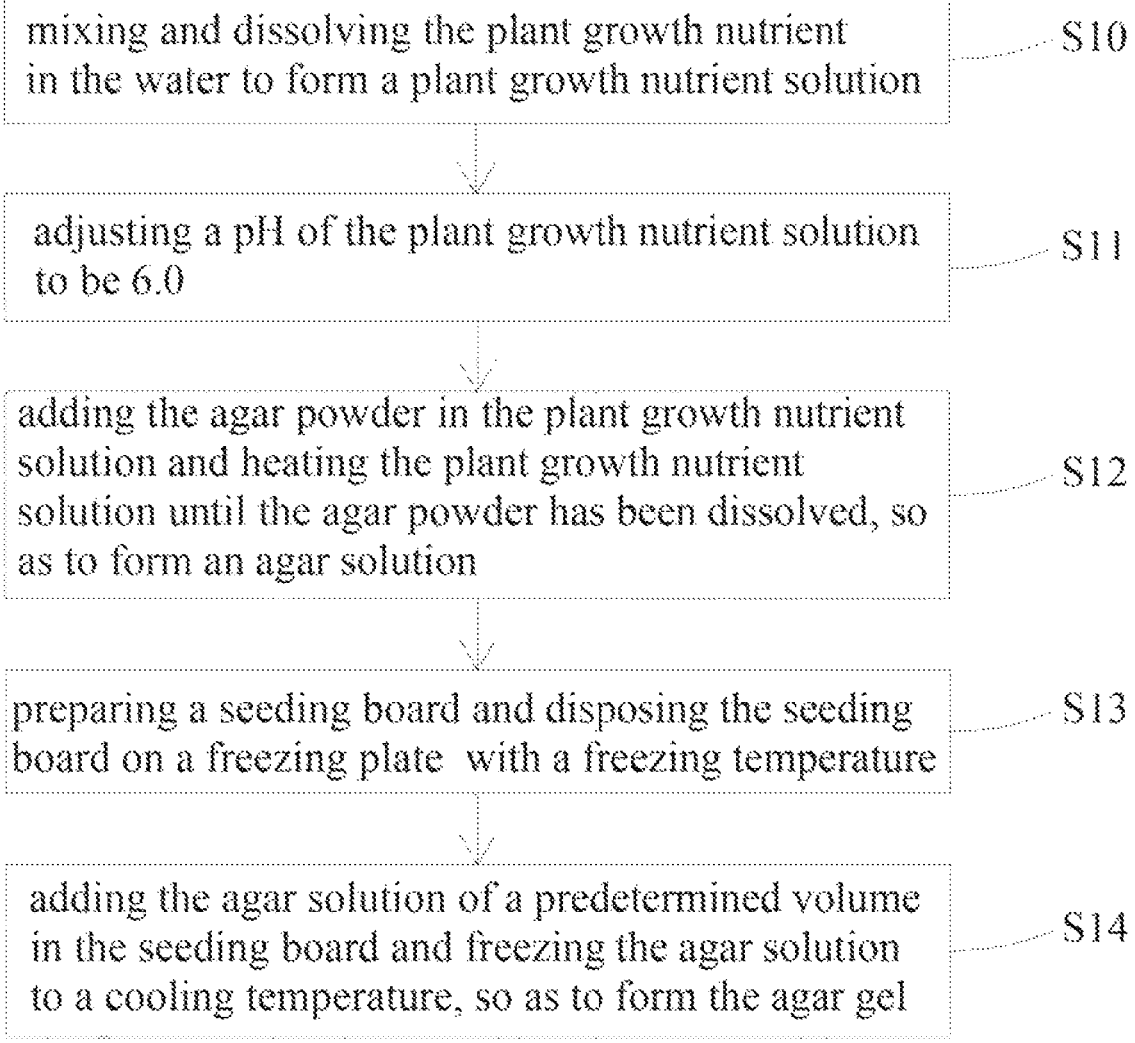
FIG. 27 is a flowchart of a culture medium manufacturing method according to an embodiment of the present disclosure.
Figure 28:
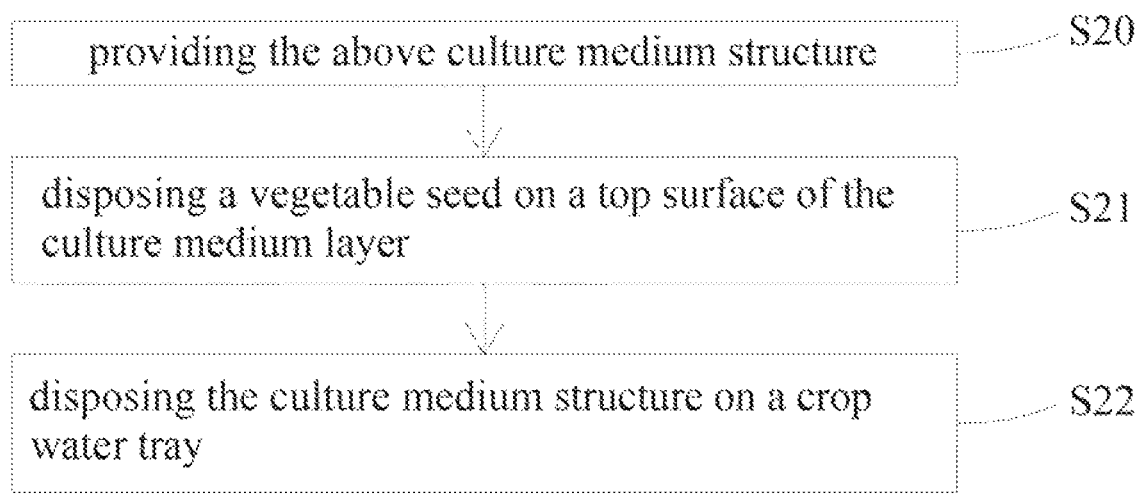
FIG. 28 is a flowchart of a culture medium structure usage method according to an embodiment of the present disclosure.

Refer to FIG. 18 through FIG. 28, FIG. 18 is a schematic diagram showing a whole structure of a seeding board according to an embodiment of the present disclosure. FIGS. 19A-19C are schematic diagrams showing tilted angles of seeding boards according to embodiments of the present disclosure, FIGS. 20-22 are schematic diagrams showing steps of a culture medium manufacturing method according to an embodiment of the present disclosure, FIG. 23 is a schematic diagram showing a culture medium structure according to an embodiment of the present disclosure. FIGS. 24-26 are schematic diagrams showing steps of a culture medium structure usage method according to embodiments of the present disclosure, and FIGS. 27 and 28 are a flowcharts of a culture medium manufacturing method and culture medium structure usage method according to embodiments of the present disclosure. Another main objective of the present disclosure is to provide a culture medium manufacturing method, comprising steps of: step (S10), mixing and dissolving the plant growth nutrient in the water to form a plant growth nutrient solution, wherein in implementations, the plant growth nutrient is weighed and selected, plant growth nutrient is at least one or combination of twos selected front diammonium phosphate, potassium nitrate, calcium nitrate, magnesium sulphate, manganese (III) chloride, femurs sulfate, boric acid, zinc sulfate, copper sulfate, ammonium molybdate and silicon dioxide, then the component or components of the plant growth nutrient are poured in the container of the water, the solution is stirred until the plant growth nutrient is uniformly dissolved, and next, according to the required weight percentage of the plant growth nutrient, water are added so make the agar gel be 100 wt %; step (S11), adjusting a pH of the plant growth nutrient solution to be 6.0, so as to prevent the chemical precipitation and the non-uniform dissolution of the plant growth nutrient in the plant growth nutrient solution due to the high or low pH, which may affect fertility; step (S12), adding the agar powder in the plant growth nutrient solution and heating the plant growth nutrient solution until the agar powder has been dissolved, so as to form an agar solution 202, wherein in implementations, when adding the agar powder in the plant growth nutrient solution, the plant growth nutrient solution is heated and stirred to make the agar powder uniformly dissolved to form live agar solution 202; step (S13), preparing a seeding board 110 and disposing the seeding board 110 on a freezing plate 400 with a freezing temperature, wherein in implementations, the seeding board 110 is disposed on the freezing plate 400 in advance, so as to ease the post processes; step (S14), adding the agar solution 202 of a predetermined volume in the seeding board 110 and freezing the agar solution 202 to a cooling temperature, so as to form the agar gel 203, wherein in implementations, after the surface of the agar solution 202 which contacts the freezing plate 400 is concreted to form the agar gel 203, the seeding board 110 is removed from the freezing plate 400, and the agar solution 202 is cooled down to a cooling temperature to form the whole agar gel 203. In implementations, according to the size of the seeding board 110, the agar solution 202 of the predetermined volume is added in the seeding board 110, and by using the freezing plate 400, the agar solution 202 is concreted to form the agar gel 203 with the solid status. In one embodiment, the predetermined volume is 0.3 through 0.7 ml, and in implementations, according to the size of the container of the culture medium and growth condition of the planted crop, the predetermined volume can be adjusted. In one embodiment, the freezing temperature is −10° C. through 10° C., and in implementations, by the freezing temperature being −10° C. through 10° C., the freezing plate 400 can concrete the surface of the agar solution which contacts the freezing plate 400 to form the agar gel 203 in advance. In one embodiment, the cooling temperature can be 50° C., and in implementations, the cooling temperature is adjusted to be 50° C., such that the agar solution 202 is cooled down and concreted to form the agar gel 203 with a good quality.

To make the objectives, features and technical results of the present disclosure can be easily understood, a detailed and implemented culture medium manufacturing method is illustrated as an embodiment, so as to proof the application scope of the culture medium manufacturing method of the present disclosure, but the present disclosure is not limited by the illustrated embodiment. According to the objective of the present disclosure, another one culture medium manufacturing method is also implemented, which comprises steps of: step (S10), mixing and dissolving the plant growth nutrient in the water to form a plant growth nutrient solution; step (S11), adjusting a pH of the plant growth nutrient solution to be 6.0; step (S12) adding the agar powder in the plant growth nutrient solution and heating the plant growth nutrient solution until the agar powder has been dissolved, so as to form an agar solution 202; and step (S13), preparing a seeding board 110 and disposing the seeding board 110 on a freezing plate 400 with a freezing temperature; and step (S14), adding the agar solution 4 of a predetermined volume in the seeding board 400 and freezing the agar solution 202 to a cooling temperature, so as to form the agar gel 203.

Another one main objective of the present disclosure is to provide a culture medium structure which comprises a culture medium layer 20 of the culture medium and a seeding board 110 for receiving the culture medium layer 20. In implementations, the culture medium layer 20 is formed in the seeding board 110 in advance, or the formed culture medium layer 20 is added in the seeding board 110. The seeding board 110 comprises a hollow body 111, and the hollow body 111 has a top hole 113 and a bottom hole 114 being opposite to the top hole 113. In implementations, the hollow body 111 makes the culture medium layer 20 not slide outside the hollow body 111, the agar solution 202 can be added in the seeding board 110 via the top hole 113, the top hole 113 makes the planted crop grow upward, the root of the planted crop can penetrate the bottom hole 114, and a top base 115 can be disposed on a top peripheral of the hollow body 111, and the hollow body 111 and the top base 115 are integrally formed. In one embodiment, the hollow body 111 can have a cylindrical structure which the top hole 113 and bottom hole 114 have an identical diameter; the hollow body 111 can have a cone structure which the top hole 113 has the diameter larger than that of the bottom hole 114. Further, the cylindrical structure or cone structure of the hollow body 111 further has a protrusion 1140, wherein the protrusion 1140 is disposed around an inner perimeter of the bottom hole 114, and used to support the culture medium layer 20, such that the culture medium layer 20 will not slide outside the hollow body 111. Or alternatively, the bottom hole 114 further comprises a seal 1141 for sealing the bottom hole 114, such that the culture medium layer 20 will not slide outside the hollow body 111, and the seal 1141 can further have multiple through holes 1142, such that the root of the planted crop can penetrate the through holes 1142 of the seal 1141 to absorb the nutrient. In one embodiment, an outer curved surface 112 of the hollow body 111 and a horizontal plane P have a tilted angle θ being less than 90 degrees. In one embodiment, an outer curved surface 112 of the hollow body 111 and a Horizontal plane P have a tilted angle θ being 77 degrees. In implementations, by the design that the an outer curved surface 112 of the hollow body 111 and a horizontal plane P have a tilted angle θ, the culture medium layer 20 will not slide outside the hollow body 111. In one embodiment, the culture medium structure further comprises a water-retaining film 116, disposed to cover the top hole 113; or the culture medium structure further comprises a water-retaining film 116, disposed to cover the top hole 113 and the top base 115. The water-retaining film 116 is used keep the water to vapor in the culture medium layer 20 of the culture medium structure. In one embodiment, the culture medium structure further comprises a crop rack, having multiple crop holes. The top base 115 of the seeding board 110 can be engaged to the crop hole, and the crop rack is installed on a crop cistern. The crop cistern can be disposed liquid therein, such that the root of the planted crop can penetrate the bottom hole 114 to absorb the liquid.

Another one main objective of live present disclosure is to provide a culture medium structure usage method, at least comprising: step (S20), providing the above culture medium structure; step (S21), disposing a vegetable seed 5 on the culture medium layer 20; and step (S22), disposing the culture medium structure on a crop cistern. In implementations, the crop cistern can be disposed with the liquid in advance, or disposed the liquid after the vegetable seed 300 has germinated. After the vegetable seed 5 germinates, the top hole 113 allows the planted crop to grow upward, and the root of the planted crop penetrates the bottom hole 114 to absorb the liquid on the crop cistern. In one embodiment, the vegetable seed 300 can be a lettuce or brassicaceae seed.

To make the objectives, features and technical results of the present disclosure can be easily understood, a detailed and implemented culture medium manufacturing method is illustrated as an embodiment, so as to proof the application scope of the culture medium structure usage method of the present disclosure, but the present disclosure is mu limited by the illustrated embodiment According to the objective of the present disclosure, another one culture medium structure usage method is also implemented, which comprises steps of: step (S20), providing the above culture medium structure; step (S21), disposing a vegetable seed 300 on the culture medium layer 20; and step (S22), disposing the culture medium structure on a crop water tray.

In order to make the description of the present disclosure invention more detailed and complete, the following presents an illustrative description of the implementation mode and specific embodiments of the present disclosure, but they are not merely implementable embodiments, such that the present disclosure is not limited thereto.

Figure 29:
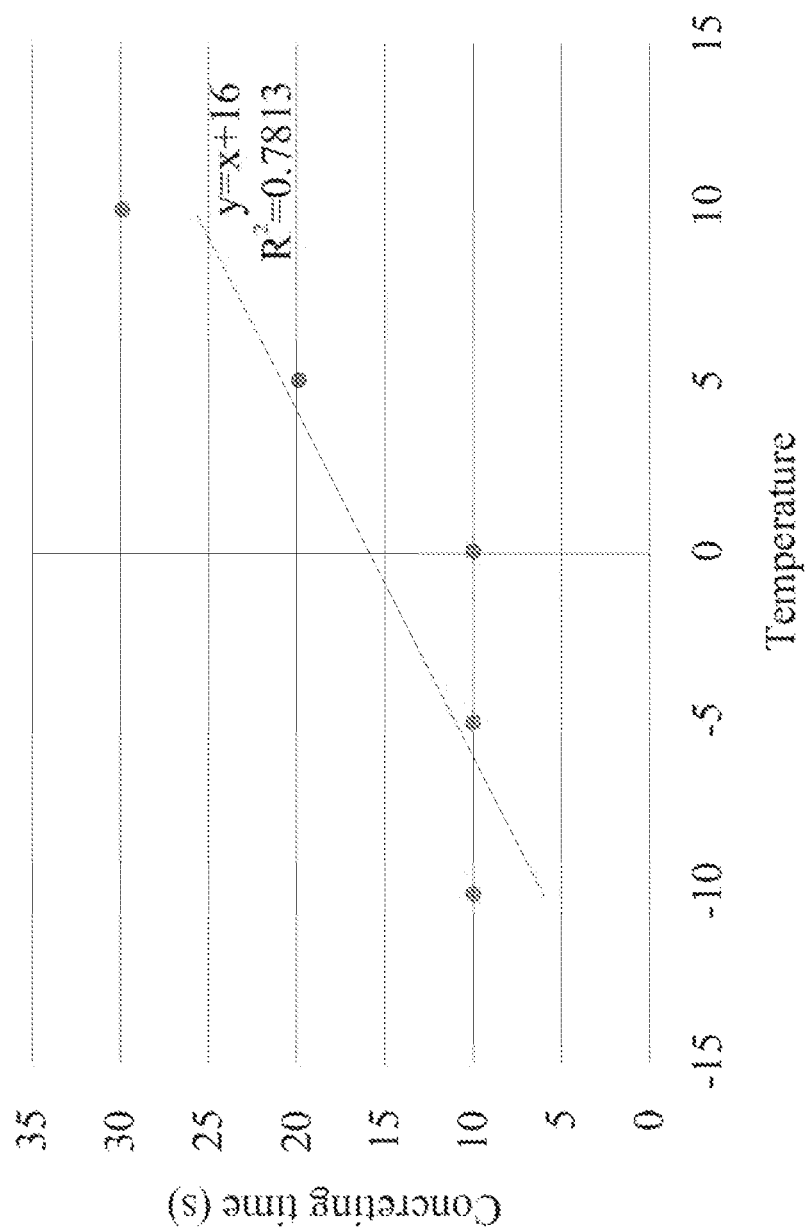
FIG. 29 is a schematic diagram showing a linear curve of a freezing temperature of a freezing plate and a concretion time and which are sufficiently enough to freeze the culture medium in a culture medium manufacturing method according to an embodiment of the present disclosure.

Referring to FIG. 29, FIG. 29 is a schematic diagram showing a linear curve of a freezing temperature of a freezing plate and a concretion time and which are sufficiently enough to freeze the culture medium in a culture medium manufacturing method according to an embodiment of the present disclosure.

<An experiment of a freezing temperature of a freezing plate and a concretion time and which are sufficiently enough to freeze the culture medium in a culture medium manufacturing method>

Estimating the freezing temperature of tire freezing plate and the concretion time and which are sufficiently enough to freeze the culture medium in a culture medium manufacturing method Test Method mixing and dissolving the plant growth nutrient in the water to form a plant growth nutrient solution; adjusting a pH of the plant growth nutrient solution to be 6.0; adding the agar powder in the plant growth nutrient solution and heating the plant growth nutrient solution until the agar powder has been dissolved, so as to form an agar solution; preparing a seeding board and disposing the seeding board on a freezing plate with a freezing temperature, and adding the agar solution of 0.5 ml in the seeding board and freezing the agar solution to 50° C., so as to form the agar gel, wherein the freezing plates with different freezing temperature are used to test, and the concretion time which the surface of the agar solution contacting the freezing plate is concrete to form the agar gel is recorded.

Results and Discussion

Refer to FIG. 29, and FIG. 29 is a schematic diagram showing a linear curve of a freezing temperature of a freezing plate and a concretion time and which are sufficiently enough to freeze the culture medium in a culture medium manufacturing method according to an embodiment of the present disclosure, wherein the X axis is used to present the different the freezing temperatures of the freezing plates, and the Y axis is used to present the concretion time. The experiment adopts freezing temperatures of −10° C., −5° C., 0° C., 5° C. and 10° C. to test, as shown in FIG. 29, the concretion limes of the freezing temperatures of −10° C., −5° C. and 0° C. are about 10 seconds, the concretion time of the freezing temperature of 5° C. is about 20 seconds, and the concretion lime of the freezing temperature of 10° C. is about 30 seconds. It can be known that the experiment result shows the freezing temperatures of −10° C., −5° C., and 0° C. need less time to concrete the surface of the agar solution contacting the freezing plate to form the agar gel in advance. Thus, the freezing temperature of the freezing plate and the concretion time and which are sufficiently enough to freeze the culture medium in the culture medium manufacturing method can be known by the experiment, and that is, in culture medium manufacturing method, the freezing plate can be used to reduce the concretion time which the surface of the agar solution contacting the freezing plate to form the agar gel in advance. When massively producing the culture medium, without affecting the quality of the agar gel of the culture medium, the production efficiency of the agar gel can be increased.

Figure 30:
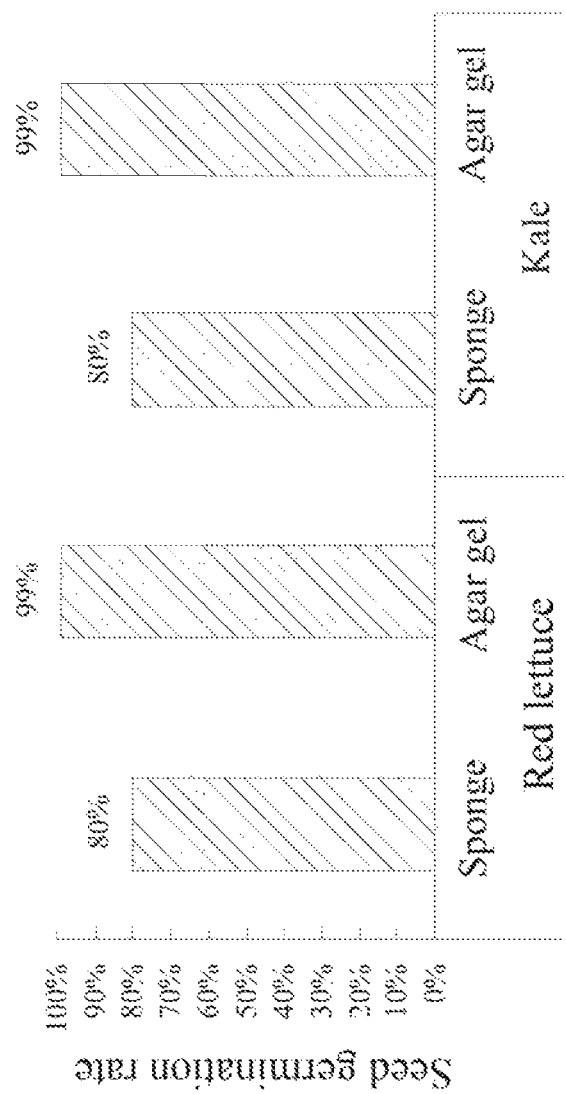
FIG. 30 is a schematic diagram showing comparison of seed germination rates of using the sponge and the agar gel of the culture medium structure usage method according to an embodiment of the present disclosure.

Refer to FIG. 30, and FIG. 30 is a schematic diagram showing comparison of seed germination rates of using the sponge and the agar gel of the culture medium structure usage method according to an embodiment of the present disclosure.

<An experiment of seed germination rates of using the sponge and agar gel>

Estimating the seed germination rates of using the sponge and agar gel

Test Method providing the culture medium structure according to one of the embodiments of the present disclosure; disposing a vegetable seed on a surface of the culture medium layer; and disposing the culture medium structure on a crop water tray, disposing a vegetable seed on or in the sponge, and disposing the sponge on the crop water tray, wherein the vegetable seeds selected to be 100 red lettuce seeds and 100 kale seeds, and after they are cultivated for 3 days, the seed germination rates of the red lettuce seeds and kale seeds are observed.

Results and Discussion

Referring to FIG. 30, in FIG. 30, the X axis is used to present the conditions of the red lettuce seeds and kale seeds which are cultivated by using the sponge and the agar gel, and the Y axis is used to present the seed germination rates of the red lettuce seeds and kale seeds of using tire sponge and the agar gel. When the vegetable seeds are red lettuce seeds, the seed germination rate of the red lettuce seeds of using the agar gel is about 99%, and the seed germination rate of the red lettuce seeds of using the sponge is about 80%; when the vegetable seeds are kale seeds, the seed germination rate of the kale seeds of using the agar gel is about 99%, and the seed germination rate of the kale seeds of using the sponge is about 80%. It can be known that the experiment shows the whole seed germination rate of the vegetable seed of using the agar gel is better than that of using the sponge. Thus, the experiment shows the result that the culture medium structure usage method of using the agar gel in the present disclosure can cultivate the vegetable seed with much enhancement of the seed germination rate. When massively cultivating the vegetable seeds, the whole seed germination rate of the vegetable seeds can much enhanced, and cases that the vegetable seeds do not germinate are dramatically decreased, so as to increase the harvest rate of the vegetable.

Figure 31:
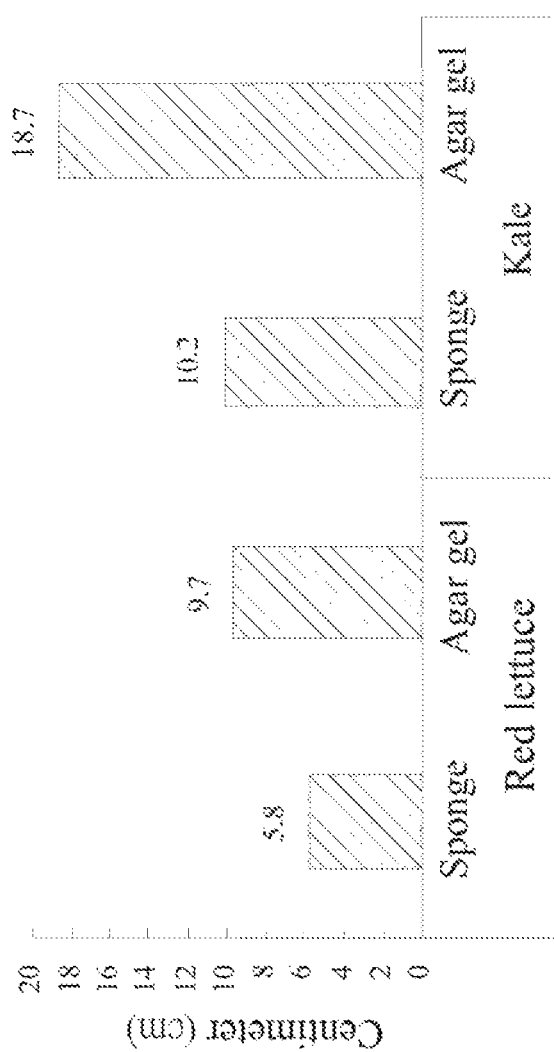
FIG. 31 is a schematic diagram showing comparison of average growth heights of planted crops of using the sponge and the agar gel of the culture medium structure usage method according to an embodiment of the present disclosure.

Refer to FIG. 31, and FIG. 31 is a schematic diagram showing comparison of average growth heights of planted crops of using the sponge and the agar gel of the culture medium structure usage method according to an embodiment of the present disclosure.

<An experiment of the average growth heights of the planted crops of using the sponge and the agar gel>

Estimating the average growth heights of the planted crops of using the sponge and the agar gel Test Method providing the culture medium structure according to one of embodiments of the present disclosure; disposing a vegetable seed on a surface of the culture medium layer, and disposing the culture medium structure on a crop water tray, disposing a vegetable seed on the sponge, and disposing the sponge on the crop water tray, wherein the vegetable seeds selected to be 100 red lettuce seeds and 100 kale seeds, and after they are cultivated for 21 days, the average growth heights of the planted red lettuce and kale are measured, wherein the average growth height of the planted crop is measured from the surface of the culture medium layer to the highest point of the planted crop.

Results and Discussion

Referring to FIG. 31, in FIG. 31, the X axis is used to present the conditions of the red lettuce seeds and kale seeds which are cultivated by using the sponge and the agar gel, and the Y axis is used to present the average growth heights of the planted crops of using the sponge and the agar gel. When the vegetable seeds are red lettuce seeds, the average growth height of the planted red lettuce of using the agar gel is about 9.7 cm, and the average growth height of the planted red lettuce of using the sponge is about 5.8 cm; when the vegetable seeds are kale seeds, the average growth height of the planted kale of using the agar gel is about 18.7 cm, and the average growth height of the planted kale of using the sponge is about 10.22 cm. Thus, the experiment shows the result that the culture medium structure usage method of using the agar gel in the present disclosure can cultivate the vegetable seed with much enhancement of the average growth height. When massively cultivating the vegetable seeds, the whole average growth height of the vegetable seeds can much enhanced, so as to increase the harvest weight of the vegetable.

Figure 32:
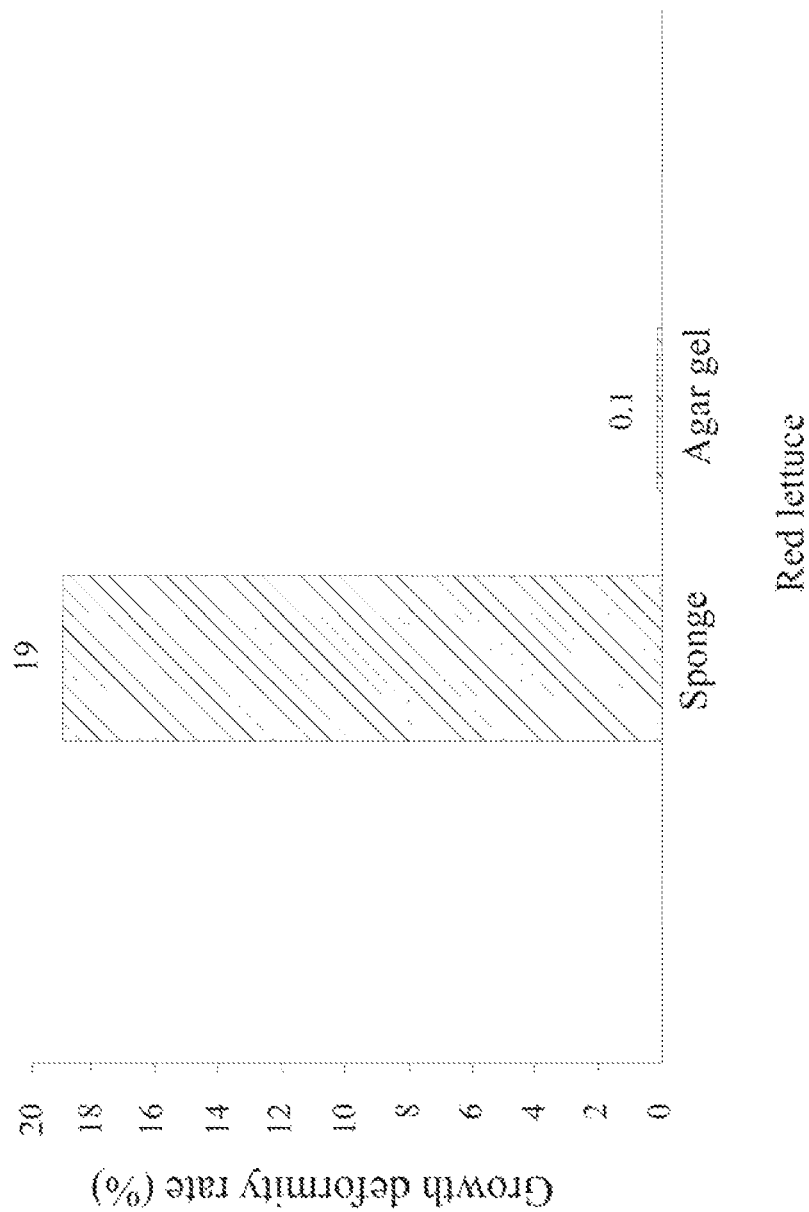
FIG. 32 is a schematic diagram showing comparison of growth deformity rates of using the sponge and the agar gel of the culture medium structure usage method according to an embodiment of the present disclosure.

Refer to FIG. 32, FIG. 32 is a schematic diagram showing comparison of growth deformity rates of using the sponge and the agar gel of the culture medium structure usage method according to an embodiment of the present disclosure.

<An experiment of the growth deformity rates of using the sponge and the agar gel>

Estimating the growth deformity rates of using the sponge and the agar gel

Test Method providing the culture medium structure according to one of embodiments of the present disclosure; disposing a vegetable seed on a surface of the culture medium layer; and disposing the culture medium structure on a crop water tray, disposing a vegetable seed on the sponge, and disposing the sponge on the crop water tray, wherein the vegetable seeds selected to be 100 red lettuce seeds, and after they are cultivated for 21 days, the growth deformity rates of the planted red lettuce are observed, wherein the growth deformity of the planted crop is defined as the condition of abnormal variation of the deformed planted crop which is compared to the normal grown planted crop.

Results and Discussion

Referring to FIG. 32, in FIG. 32, the X axis is used to present the conditions of the red lettuce seeds which are cultivated by using the sponge and the agar gel, and the Y axis is used to present the growth deformity rates of the planted crops of using the sponge and the agar gel. The growth deformity rate of the planted red lettuce of using the agar gel is about 0.1%, and the growth deformity rate of the planted red lettuce of using the sponge is about 19%. Thus, the experiment shows the result that the culture medium structure usage method of using the agar gel in the present disclosure can cultivate the vegetable seed with the lower growth deformity rate. When massively cultivating the vegetable seeds, the whole the health of the vegetable seeds can much enhanced, so as to increase the harvest quality of the planted crop.

To sum up, compared to the conventional prior art and the current product, the present disclosure has the following technical results.

One objective of the present disclosure is to provide the solid agar gel with the plant growth nutrient, and via the solid agar gel, the ratio of the plant growth nutrient is maintained, so as to prevent the accumulated of the nutrient of the hydroponics from harming the growth of the planted crops.

One objective of the present disclosure is to provide the seeding board, and after the planted crops are harvested, the seeding boards can be reused, so as to reduce the cost of crop planting of each time.

One objective of the present disclosure is to provide the solid agar gel with the plant growth nutrient, and after the planted crops are harvested, the agar gels on the planted crops can be easily cleaned out, and it does not affect the integrity of roots of the planted crops.

One objective of the present disclosure is to provide the solid agar gel with the plant growth nutrient, and compared to the plastic sponge used in the conventional hydroponics, the higher seed germination and the lower growth deformity rate are obtained, therefore harvesting more healthful planted crops.

Moreover, since the device body is provided to be stacked on or under the other one device body and shifted with the other one device body along the first direction or the second direction, the stackable raising seedling device can change the shifting configuration to change tire distribution area of the planting according to the seed characteristics of the planted crops.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A stackable raising seedling device, comprising
a device body, having raising seedling hole parts disposed at intervals and holes disposed intervals, wherein the raising seedling hole parts and the holes are staggered in parallel and with each other along a first direction, the raising seedling hole part and the holes are staggered in parallel with each other along a second direction, and the holes of the first direction and the raising seedling hole parts of the second direction are adjacently arranged; the device body has a top surface and a bottom surface, each of the raising seedling hole pans comprises a hollow body, the hollow body is formed with a top hole and a bottom hole, the bottom hole is opposite to the top hole and extending from one end of the top hole, the top hole faces the top surface, the bottom hole is located on the bottom surface, the hole and the raising seedling hole part penetrate the top surface and the bottom surface, the top surface further has at least a first alignment part, the bottom surface further has at least a second alignment part, and the first alignment part of the device body is used to be aligned and connected to the second alignment part of the other one device body; the hollow body is a cone structure that tapers from the top hole to the bottom hole, and in the cone structure, an aperture of the lop hole is the largest, and an aperture of the bottom hole is the smallest; a raising seedling hole part of another one device body is capable of placing in the hole of the device body, and the device body is provided to be stacked on or under the other one device body and shifted with the other one device body along, the first direction or the second direction; the device body is integrally formed; and a floating planting board, having perforations disposed at intervals, each of the raising seedling hole parts is placed in the corresponding perforation, the perforation has a top perforation and a bottom perforation, the bottom perforation is opposite to the top perforation and extended from one end of the top perforation, a distance between the top perforation and the bottom perforation is defined as a first depth, a distance between the lop hole and the bottom hole is defined as a second depth, the first depth is larger than the second depth, the raising seedling hole part is used to receive a culture medium layer, the culture medium layer comprises an agar gel, and the agar gel is composed of a plant growth nutrient, agar powder and water.

2. The stackable raising seedling device of claim 1, wherein the aperture of the top hole of the raising seedling hole part is less than an aperture of the hole.

3. The stackable raising seedling device of claim 1, wherein the device body is a sheet device body.

4. The stackable raising seedling device of claim 1, wherein an outer curved surface of the hollow body and a horizontal plane therebetween have a tilted angle therebetween, and the tilted angle is less than 90 degrees.

5. The stackable raising seedling device of claim 1, further comprising a water-retaining film, disposed to cover the top hole.

6. The stackable raising seedling device of claim 1, wherein the stackable raising seedling device is installed on a crop cistern.

* * * * *